US011683652B2

(12) United States Patent
Goldstein et al.

(10) Patent No.: US 11,683,652 B2
(45) Date of Patent: *Jun. 20, 2023

(54) CONTROLLING MULTI-SITE MEDIA PLAYBACK SYSTEMS

(71) Applicant: Sonos, Inc., Santa Barbara, CA (US)

(72) Inventors: Seth David Goldstein, Boston, MA (US); Greg Ramsperger, Somerville, MA (US); Michael Agerbak, Arlington, MA (US); Arthur L. Coburn, IV, Lexington, MA (US); Andy Mellors, Boston, MA (US); Nikit Waghela, Boston, MA (US); Steven Beckhardt, Boston, MA (US)

(73) Assignee: Sonos, Inc., Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/532,746

(22) Filed: Nov. 22, 2021

(65) Prior Publication Data

US 2022/0191633 A1 Jun. 16, 2022

Related U.S. Application Data

(63) Continuation of application No. 16/827,188, filed on Mar. 23, 2020, now Pat. No. 11,184,722, which is a
(Continued)

(51) Int. Cl.
*H04R 27/00* (2006.01)
*G06F 3/16* (2006.01)
(Continued)

(52) U.S. Cl.
CPC ............ *H04R 27/00* (2013.01); *G06F 3/165* (2013.01); *H04L 41/0813* (2013.01);
(Continued)

(58) Field of Classification Search
CPC ... H04R 27/00; H04R 2227/005; H04L 41/12; H04L 41/0813; H04L 61/6022; G06F 3/165
See application file for complete search history.

(56) References Cited

U.S. PATENT DOCUMENTS 5,440,644 A 8/1995 Farinelli et al.
5,761,320 A 6/1998 Farinelli et al.
(Continued)

FOREIGN PATENT DOCUMENTS

| EP | 1389853 A1 | 2/2004 |
| WO | 200153994 | 7/2001 |
| WO | 2003093950 A2 | 11/2003 |

OTHER PUBLICATIONS

AudioTron Quick Start Guide, Version 1.0, Mar. 2001, 24 pages.
(Continued)

*Primary Examiner* — Dady Chery

(57) ABSTRACT

Systems and methods for controlling multi-site media playback systems include, among other features, a computing system (i) receiving, from a first media playback device connected to a first network, a first registration message, (ii) in response to receiving the first registration message, assigning a system identifier and a first subsystem identifier to the first media playback device, (iii) receiving, from a second media playback device connected to the first network, a second registration message, (iv) in response to receiving the second registration message, assigning the system identifier and the first subsystem identifier to the second media playback device, (v) determining that the second media playback device is disconnected from the first network and connected to a second network, and (vi) in response to determining that the second media playback
(Continued)

device is connected to the second network, assigning a second subsystem identifier to the second media playback device.

20 Claims, 10 Drawing Sheets

Related U.S. Application Data continuation of application No. 16/017,754, filed on Jun. 25, 2018, now Pat. No. 10,602,286.

(51) Int. Cl.
*H04L 41/0813* (2022.01)
*H04L 41/12* (2022.01)
*H04L 101/622* (2022.01)

(52) U.S. Cl.
CPC ........ *H04L 41/12* (2013.01); *H04L 2101/622* (2022.05); *H04R 2227/005* (2013.01)

(56) References Cited

U.S. PATENT DOCUMENTS

| | | | |
|---|---|---|---|
| 5,923,902 | A | 7/1999 | Inagaki |
| 6,032,202 | A | 2/2000 | Lea et al. |
| 6,256,554 | B1 | 7/2001 | DiLorenzo |
| 6,404,811 | B1 | 6/2002 | Cvetko et al. |
| 6,469,633 | B1 | 10/2002 | Wachter |
| 6,522,886 | B1 | 2/2003 | Youngs et al. |
| 6,611,537 | B1 | 8/2003 | Edens et al. |
| 6,631,410 | B1 | 10/2003 | Kowalski et al. |
| 6,757,517 | B2 | 6/2004 | Chang |
| 6,778,869 | B2 | 8/2004 | Champion |
| 7,130,608 | B2 | 10/2006 | Hollstrom et al. |
| 7,130,616 | B2 | 10/2006 | Janik |
| 7,143,939 | B2 | 12/2006 | Henzerling |
| 7,236,773 | B2 | 6/2007 | Thomas |
| 7,295,548 | B2 | 11/2007 | Blank et al. |
| 7,391,791 | B2 | 6/2008 | Balassanian et al. |
| 7,483,538 | B2 | 1/2009 | McCarty et al. |
| 7,571,014 | B1 | 8/2009 | Lambourne et al. |
| 7,630,501 | B2 | 12/2009 | Blank et al. |
| 7,643,894 | B2 | 1/2010 | Braithwaite et al. |
| 7,657,910 | B1 | 2/2010 | McAulay et al. |
| 7,853,341 | B2 | 12/2010 | McCarty et al. |
| 7,987,294 | B2 | 7/2011 | Bryce et al. |
| 8,014,423 | B2 | 9/2011 | Thaler et al. |
| 8,045,952 | B2 | 10/2011 | Qureshey et al. |
| 8,103,009 | B2 | 1/2012 | McCarty et al. |
| 8,234,395 | B2 | 7/2012 | Millington |
| 8,483,853 | B1 | 7/2013 | Lambourne |
| 8,942,252 | B2 | 1/2015 | Balassanian et al. |
| 9,646,085 | B2 | 5/2017 | Kuper |
| 9,674,587 | B2 | 6/2017 | Triplett et al. |
| 2001/0042107 | A1 | 11/2001 | Palm |
| 2002/0022453 | A1 | 2/2002 | Balog et al. |
| 2002/0026442 | A1 | 2/2002 | Lipscomb et al. |
| 2002/0124097 | A1 | 9/2002 | Isely et al. |
| 2003/0157951 | A1 | 8/2003 | Hasty, Jr. |
| 2004/0024478 | A1 | 2/2004 | Hans et al. |
| 2006/0126211 | A1 | 6/2006 | Sasaki |
| 2007/0142944 | A1 | 6/2007 | Goldberg et al. |
| 2015/0142931 | A1 | 5/2015 | Dong |
| 2015/0356084 | A1 | 12/2015 | Stephenson |
| 2018/0107446 | A1 | 4/2018 | Wilberding et al. |

OTHER PUBLICATIONS

AudioTron Reference Manual, Version 3.0, May 2002, 70 pages.
AudioTron Setup Guide, Version 3.0, May 2002, 38 pages.
Bluetooth. "Specification of the Bluetooth System: The ad hoc SCATTERNET for affordable and highly functional wireless connectivity," Core, Version 1.0 A, Jul. 26, 1999, 1068 pages.
Bluetooth. "Specification of the Bluetooth System: Wireless connections made easy," Core, Version 1.0 B, Dec. 1, 1999, 1076 pages.
Dell, Inc. "Dell Digital Audio Receiver: Reference Guide," Jun. 2000, 70 pages.
Dell, Inc. "Start Here," Jun. 2000, 2 pages.
"Denon 2003-2004 Product Catalog," Denon, 2003-2004, 44 pages.
International Bureau, International Preliminary Report on Patentability, dated Dec. 29, 2020, issued in connection with International Application No. PCT/US2019/039040, filed on Jun. 25, 2019, 6 pages.
International Bureau, International Search Report and Written Opinion dated Aug. 29, 2019, issued in connection with International Application No. PCT/US2019/039040, filed on Jun. 25, 2019, 8 pages.
Jo et al., "Synchronized One-to-many Media Streaming with Adaptive Playout Control," Proceedings of SPIE, 2002, pp. 71-82, vol. 4861.
Jones, Stephen, "Dell Digital Audio Receiver: Digital upgrade for your analog stereo," Analog Stereo, Jun. 24, 2000 http://www.reviewsonline.com/articles/961906864.htm retrieved Jun. 18, 2014, 2 pages.
Louderback, Jim, "Affordable Audio Receiver Furnishes Homes With MP3," TechTV Vault. Jun. 28, 2000 retrieved Jul. 10, 2014, 2 pages.
Non-Final Office Action dated Jun. 18, 2021, issued in connection with U.S. Appl. No. 16/827,188, filed Mar. 23, 2020, 5 pages.
Non-Final Office Action dated Jun. 25, 2019, issued in connection with U.S. Patent Application No. 16/017,754, filed Jun. 25, 2018, 34 pages.
Notice of Allowance dated Nov. 15, 2019, issued in connection with U.S. Appl. No. 16/017,754, filed Jun. 25, 2018, 5 pages.
Notice of Allowance dated Sep. 29, 2021, issued in connection with U.S. Appl. No. 16/827,188, filed Mar. 23, 2020, 5 pages.
Palm, Inc., "Handbook for the Palm VII Handheld," May 2000, 311 pages.
Presentations at WinHEC 2000, May 2000, 138 pages.
U.S. Appl. No. 60/490,768, filed Jul. 28, 2003, entitled "Method for synchronizing audio playback between multiple networked devices," 13 pages.
U.S. Appl. No. 60/825,407, filed Sep. 12, 2006, entitled "Controlling and manipulating groupings in a multi-zone music or media system," 82 pages.
UPnP; "Universal Plug and Play Device Architecture," Jun. 8, 2000; version 1.0; Microsoft Corporation; pp. 1-54.
Yamaha DME 64 Owner's Manual; copyright 2004, 80 pages.
Yamaha DME Designer 3.5 setup manual guide; copyright 2004, 16 pages.
Yamaha DME Designer 3.5 User Manual; Copyright 2004, 507 pages.

CONTROLLING MULTI-SITE MEDIA PLAYBACK SYSTEMS

CROSS-REFERENCE TO RELATED APPLICATIONS

The present application is a continuation of U.S. application Ser. No. 16/827,188, filed on Mar. 23, 2020, titled "Controlling Multi-Site Media Playback Systems," which is a continuation of U.S. application Ser. No. 16/017,754, filed on Jun. 25, 2018, titled "Controlling Multi-Site Media Playback Systems," each of which are hereby incorporated by reference in their entireties.

FIELD OF THE DISCLOSURE

The disclosure is related to consumer goods and, more particularly, to methods, systems, products, features, services, and other elements directed to media playback and aspects thereof.

BACKGROUND

Options for accessing and listening to digital audio in an out-loud setting were limited until in 2003, when Sonos, Inc. filed for one of its first patent applications, entitled "Method for Synchronizing Audio Playback between Multiple Network devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever-growing interest in digital media, there continues to be a need to develop consumer-accessible technologies to further enhance the listening experience.

SUMMARY

The present disclosure describes systems and methods for, among other things, controlling multi-site media playback systems. Controlling multi-site media playback systems is important for media playback systems where a single user has multiple media playback devices deployed at multiple physical locations, where all of the media playback devices are associated with (and controlled by) the single user for multiple reasons. For example, sometimes it is desirable for certain configuration changes that the user makes to the media playback devices in one location to be applied to the user's media playback devices in other locations. Similarly, it is sometimes helpful for media playback devices at one physical location to have information about actions performed by media playback devices at a different physical location, for example, for the purpose of facilitating development of user preferences based on media playback activity. By facilitating multi-site management of geographically dispersed media playback systems associated with a single user, the systems and methods disclosed and described herein improve upon current media playback systems lacking such functionality by making configuration changes consistent across a multi-site deployment and correlating usage history data from geographically dispersed playback devices, thereby making the media playback system easier for users to configure and manage.

A first example embodiment involves a computing system receiving, from a first media playback device connected to a first network, a first registration message. The computing device then, in response to receiving the first registration message, assigns a system identifier and a first subsystem identifier to the first media playback device. The system identifier is associated with the computing system, and the first subsystem identifier is associated with the system identifier. Next, the computing device receives, from a second media playback device connected to the first network, a second registration message. Then, in response to receiving the second registration message, the computing device assigns the system identifier and the first subsystem identifier to the second media playback device. The computing device then determines that the second media playback device is disconnected from the first network and connected to a second network. Next, in response to determining that the second media playback device is connected to the second network, the computing device assigns a second subsystem identifier to the second media playback device. The second subsystem identifier is associated with the system identifier. The computing system then transmits to the second media playback device, a message comprising the second subsystem identifier. Finally, the computing device receives a request directed to devices associated with the second subsystem identifier, and based on the request being directed to devices associated with the second subsystem identifier, causes the second media playback device to process the request.

This above-described procedure is useful in scenarios where it is difficult for a cloud computing system to keep track of where devices are located so that the cloud computing system can determine which devices might need configuration changes at a second location when a user makes configuration changes to the devices at a second location. For example, when a user issues a command to the cloud computing system to skip the currently playing song, the user likely wants the command to be applied to the devices that are connected in the same location as the user. In response to receiving the command, the cloud computing system issues a skip song command only to devices at the location at which the user is connected. By assigning subsystem identifiers to playback devices based on location, a cloud computing system can more effectively route commands that are intended for devices that are in a particular location (e.g., devices that have a particular subsystem identifier).

A second example embodiment involves a first media playback device connecting to a first network. The first media playback device then transmits to a computing system, a first registration message. Next, the first media playback device receives, from the computing system, a system identifier and a first subsystem identifier. The first subsystem identifier is associated with the system identifier. Later, after the first media playback device disconnects from the first network, the first media playback device connects to a second network. After connecting to the second network, the first media playback device transmits, to the computing system, a second registration message. After transmitting the second registration message, the first media playback device then receives, from the computing system, a second subsystem identifier. The second subsystem identifier is associated with the system identifier. Next, the first media playback device configures the first media playback device to use the second subsystem identifier. Finally, the first media playback device receives, from the computing system, one or more commands to implement a change affecting all devices to which the first subsystem identifier has been assigned.

Some embodiments include an article of manufacture comprising tangible, non-transitory, computer-readable media storing program instructions that, upon execution by one or more processors of a playback device, cause the playback device to perform operations in accordance with the example embodiments disclosed herein.

Some embodiments include a playback device comprising one or more processors, as well as tangible, non-transitory, computer-readable media storing program instructions that, upon execution by the one or more processors, cause the playback device to perform operations in accordance with the example embodiments disclosed herein.

This summary overview is illustrative only and is not intended to be limiting. In addition to the illustrative aspects, embodiments, and features described above, further aspects, embodiments, and features will become apparent by reference to the figures and the following detailed description.

BRIEF DESCRIPTION OF THE DRAWINGS

Features, aspects, and advantages of the presently disclosed technology may be better understood with regard to the following description, appended claims, and accompanying drawings where:

Figure 1:
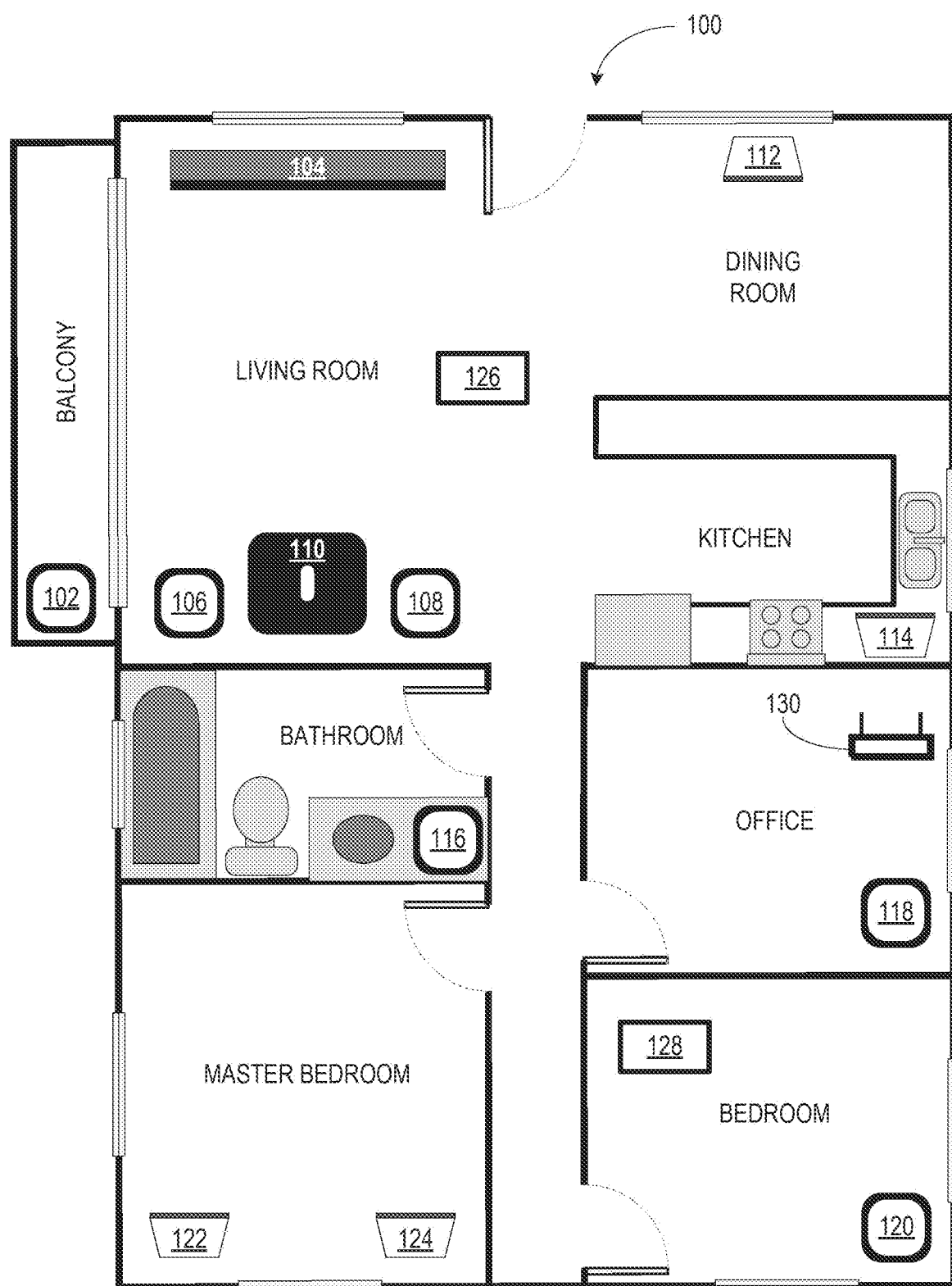
FIG. 1 is a schematic plan view of a media playback system configured in accordance with embodiments of the disclosed technology.

The drawings are for the purpose of illustrating example embodiments, but it is understood that the inventions are not limited to the arrangements and instrumentalities shown in the drawings.

DETAILED DESCRIPTION

I. Overview

A media playback system according to some embodiments disclosed herein includes a number of media playback devices connected to a computing system. The media playback devices may include audio playback devices, video playback devices, and/or networked microphone devices. In operation, the computing system assigns the media playback devices a system identifier, which indicates that each of the media playback devices is part of the media playback system. In this type of media playback system, when a change (e.g., setting and/or configuration) is made on one of the media playback devices, the computing system issues one or more commands to implement the change on the other media playback devices that were assigned the system identifier. The media playback devices then implement the change in response to receiving the one or more commands from the computing system.

While using a system identifier may be effective in media playback systems located on one local area network (LAN), it might not be as effective in media playback systems spread across multiple LANs. This is due in part to typical computing systems being limited to issuing commands on one network. For example, a user may have a first media playback device in a first location (e.g., a playback device at work) and a second media playback device in a second location (e.g., a networked microphone device at home). Using a conventional computing system, if a user makes a configuration change on the first media playback device, the change would not be applied to the second media playback device. To implement the configuration change on the second media playback device, the user would have to subsequently make the configuration change on the second media playback device, resulting in duplicative efforts. However, with the development of cloud server technology in accordance with aspects described herein, the computing system according to some embodiments has the ability to propagate changes made on the first media playback device to the second media playback device, even though the first and second media playback devices are located on different LANs.

One challenge with using a computing system individually or in combination with cloud server technology to propagate changes to media playback devices connected to different networks in different locations is that a system identifier might not adequately identify which media playback device belongs to each network, and/or it may not accurately or adequately indicate which media playback devices are connected to which network. To overcome this challenge, in some embodiments, the computing system assigns a subsystem identifier to each media playback device in the media playback system. The subsystem identifier is unique to the network to which the media playback device is connected. In operation, the computing system assigns a first subsystem identifier to a first media playback device connected to a first network (e.g., a playback device connected to a user's home network) and a second subsystem identifier to a second media playback device connected to a second network (e.g., a networked microphone device connected to a user's work network). Then, if a user makes a configuration change on the first media playback device, the computing system (i) sends a command to implement the change to all other media playback devices that have been assigned the first subsystem identifier, and subsequently (ii) sends a command to implement the change to all other media playback devices that have been assigned the second subsystem identifier.

In some embodiments, a user may set up and connect a first media playback device and second media playback device to a first network. In response, the computing system may assign the same subsystem identifier to the first and second media playback devices. Subsequently, the user may move the second media playback device and connect it to a second network. The computing system may then determine the second media playback system has been disconnected from the first network and connected to the second network, then assign a different subsystem identifier to the second media playback device. As explained in further detail below, the computing system may assign media playback devices different subsystem identifiers based on a physical location and information about the media playback devices themselves.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130. In operation, any of the playback devices (PBDs) 102-124 may be voice-enabled devices (VEDs) as described earlier.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
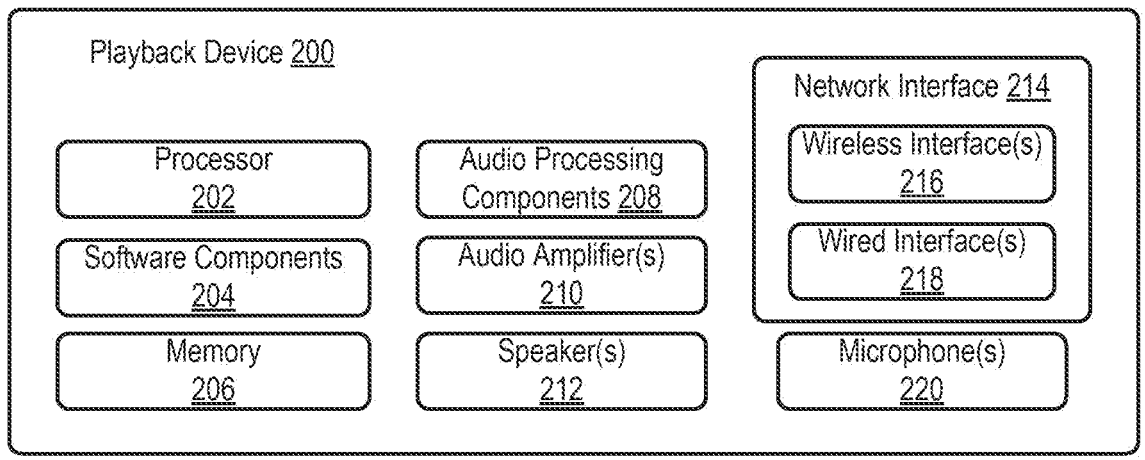
FIG. 2 is a functional block diagram of an example playback device.

FIG. 2 shows a functional block diagram of an example playback device 200 that may be configured to be one or more of the playback devices 102-124 of the media playback system 100 of FIG. 1. As described above, a playback device (PBD) 200 is one type of voice-enabled device (VED).

The playback device 200 includes one or more processors 202, software components 204, memory 206, audio processing components 208, audio amplifier(s) 210, speaker(s) 212, a network interface 214 including wireless interface(s) 216 and wired interface(s) 218, and microphone(s) 220. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In some examples, the one or more processors 202 include one or more clock-driven computing components configured to process input data according to instructions stored in the memory 206. The memory 206 may be a tangible, non-transitory computer-readable medium configured to store instructions executable by the one or more processors 202. For instance, the memory 206 may be data storage that can be loaded with one or more of the software components 204 executable by the one or more processors 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the one or more processors 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network, including but not limited to data to/from other VEDs (e.g., commands to perform an SPL measurement, SPL measurement data, commands to set a system response volume, and other data and/or commands to facilitate performance of the features and functions disclosed and described herein). As such, the playback device 200 may be configured to receive audio content over the data network from one or more other playback devices in communication with the playback device 200, network devices within a local area network, or audio content sources over a wide area network such as the Internet. The playback device 200 may transmit metadata to and/or receive metadata from other devices on the network, including but not limited to components of the networked microphone system disclosed and described herein. In one example, the audio content and other signals (e.g., metadata and other signals) transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

The microphone(s) 220 may be arranged to detect sound in the environment of the playback device 200. For instance, the microphone(s) may be mounted on an exterior wall of a housing of the playback device. The microphone(s) may be any type of microphone now known or later developed such as a condenser microphone, electret condenser microphone, or a dynamic microphone. The microphone(s) may be sensitive to a portion of the frequency range of the speaker(s) 220. One or more of the speaker(s) 220 may operate in reverse as the microphone(s) 220. In some aspects, the playback device 200 might not have microphone(s) 220.

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices", "bonded group", or "stereo pair") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional audio drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, Sonos, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the Sonos product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices and/or other VEDs. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone may be combined into a zone group for a dinner party such that playback devices 112 and 114 may render (e.g., play back) audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
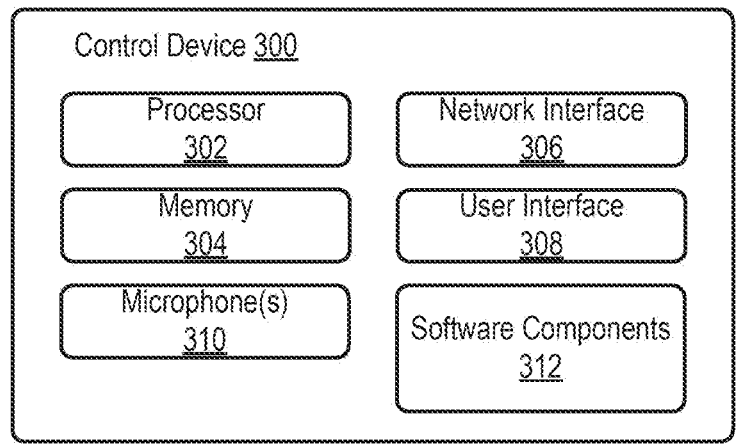
FIG. 3 is a functional block diagram of an example control device.

FIG. 3 shows a functional block diagram of an example control device 300 that may be configured to be one or both of the control devices 126 and 128 of the media playback system 100. As shown, the control device 300 may include one or more processors 302, memory 304, a network interface 306, a user interface 308, microphone(s) 310, and software components 312. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The one or more processors 302 may be configured to perform functions relevant to facilitating user access, control, and configuration of the media playback system 100. The memory 304 may be data storage that can be loaded with one or more of the software components executable by the one or more processors 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 3G, 4G, or 5G mobile communication standards, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Control device 300 may include microphone(s) 310. Microphone(s) 310 may be arranged to detect sound in the environment of the control device 300. Microphone(s) 310 may be any type of microphone now known or later developed such as a condenser microphone, electret condenser microphone, or a dynamic microphone. The microphone(s) may be sensitive to a portion of a frequency range. Two or more microphones 310 may be arranged to capture location information of an audio source (e.g., voice, audible sound) and/or to assist in filtering background noise.

Figure 4:
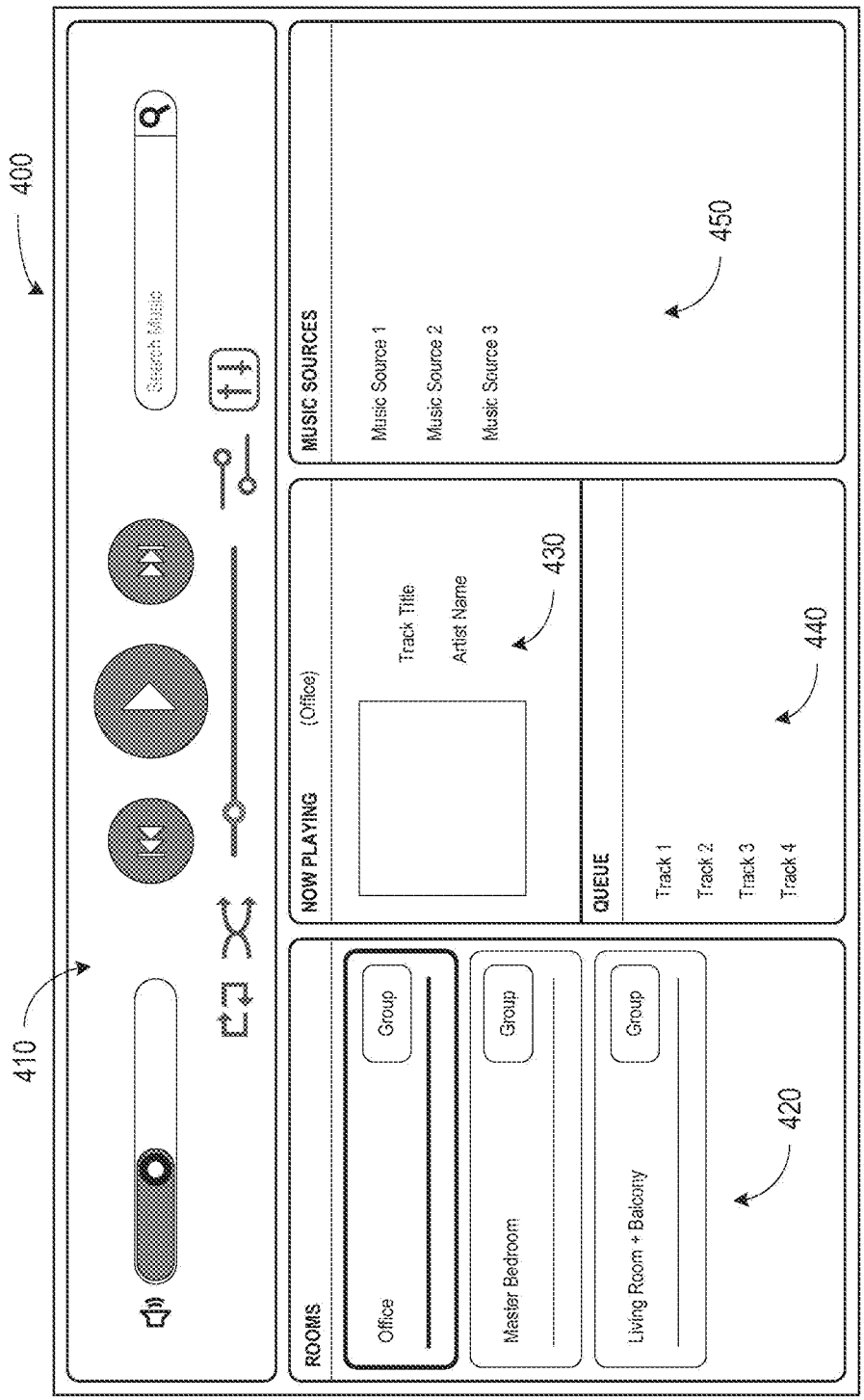
FIG. 4 is a diagram of an example controller interface.

The user interface 308 of the control device 300 may be configured to facilitate user access and control of the media playback system 100, by providing a controller interface such as the example controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

e. Example Plurality of Network devices

Figure 5:
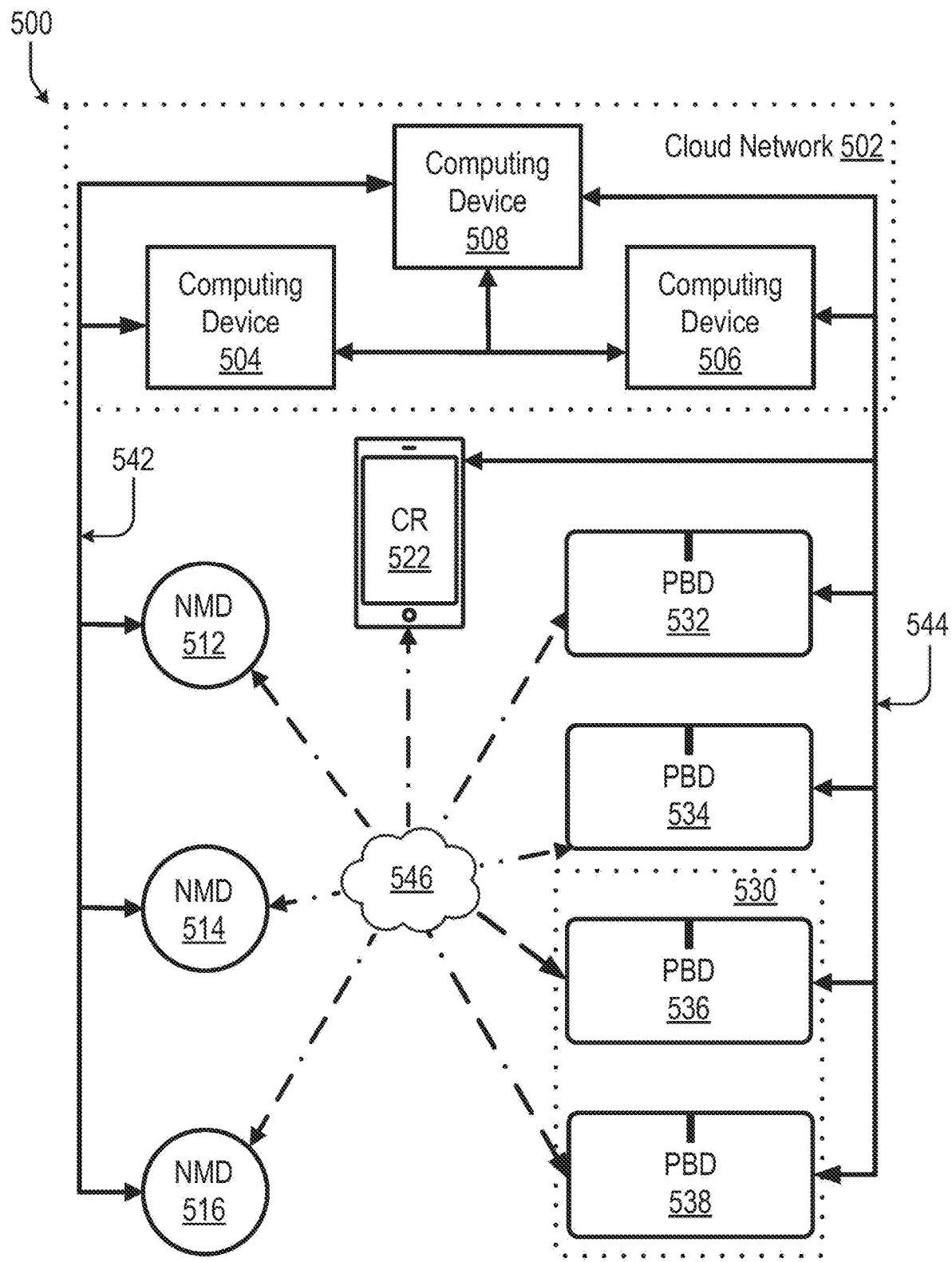
FIG. 5 is a functional block diagram of a plurality of network devices.

FIG. 5 shows an example plurality of network devices 500 that can be configured to provide an audio playback experience with voice control. One having ordinary skill in the art will appreciate that the devices shown in FIG. 5 are for illustrative purposes only, and variations including different and/or additional (or fewer) devices may be possible. As shown, the plurality of network devices 500 includes computing devices 504, 506, and 508; network microphone devices (NMDs) 512, 514, and 516; playback devices (PBDs) 532, 534, 536, and 538; and a controller device (CR) 522. As described previously, any one or more (or all) of the NMDs 512-16, PBDs 532-38, and/or CR 522 may be voice-enabled devices (VEDs).

Each of the plurality of network devices 500 are network-capable devices that can establish communication with one or more other devices in the plurality of devices according to one or more network protocols, such as NFC, Bluetooth™, Ethernet, and IEEE 802.11, among other examples, over one or more types of networks, such as wide area networks (WAN), local area networks (LAN), and personal area networks (PAN), among other possibilities.

As shown, the computing devices 504, 506, and 508 are part of a cloud network 502. The cloud network 502 may include additional computing devices (not shown). In one example, the computing devices 504, 506, and 508 may be different servers. In another example, two or more of the computing devices 504, 506, and 508 may be modules of a single server. Analogously, each of the computing device 504, 506, and 508 may include one or more modules or servers. For ease of illustration purposes herein, each of the computing devices 504, 506, and 508 may be configured to perform particular functions within the cloud network 502. For instance, computing device 508 may be a source of audio content for a streaming music service.

As shown, the computing device 504 may be configured to interface with NMDs 512, 514, and 516 via communication path 542. NMDs 512, 514, and 516 may be components of one or more "Smart Home" systems. In one case, NMDs 512, 514, and 516 may be physically distributed throughout a household, similar to the distribution of devices shown in FIG. 1. In another case, two or more of the NMDs 512, 514, and 516 may be physically positioned within relative close proximity of one another. Communication path 542 may comprise one or more types of networks, such as a WAN including the Internet, LAN, and/or PAN, among other possibilities.

In one example, one or more of the NMDs 512, 514, and 516 are devices configured primarily for audio detection. In another example, one or more of the NMDs 512, 514, and 516 may be components of devices having various primary utilities. For instance, as discussed above in connection to FIGS. 2 and 3, one or more of NMDs 512, 514, and 516 may be (or at least may include or be a component of) the microphone(s) 220 of playback device 200 or the microphone(s) 310 of network device 300. Further, in some cases, one or more of NMDs 512, 514, and 516 may be (or at least may include or be a component of) the playback device 200 or network device 300. In an example, one or more of NMDs 512, 514, and/or 516 may include multiple microphones arranged in a microphone array. In some embodiments, one or more of NMDs 512, 514, and/or 516 may be a microphone on a mobile computing device (e.g., a smartphone, tablet, or other computing device).

As shown, the computing device 506 is configured to interface with CR 522 and PBDs 532, 534, 536, and 538 via communication path 544. In one example, CR 522 may be a network device such as the network device 200 of FIG. 2. Accordingly, CR 522 may be configured to provide the controller interface 400 of FIG. 4. Similarly, PBDs 532, 534, 536, and 538 may be playback devices such as the playback device 300 of FIG. 3. As such, PBDs 532, 534, 536, and 538 may be physically distributed throughout a household as shown in FIG. 1. For illustration purposes, PBDs 536 and 538 are shown as members of a bonded zone 530, while PBDs 532 and 534 are members of their own respective zones. As described above, the PBDs 532, 534, 536, and 538 may be dynamically bonded, grouped, unbonded, and ungrouped. Communication path 544 may comprise one or more types of networks, such as a WAN including the Internet, LAN, and/or PAN, among other possibilities.

In one example, as with NMDs 512, 514, and 516, CR 522 and PBDs 532, 534, 536, and 538 may also be components of one or more "Smart Home" systems. In one case, PBDs 532, 534, 536, and 538 may be distributed throughout the same household as the NMDs 512, 514, and 516. Further, as suggested above, one or more of PBDs 532, 534, 536, and 538 may be one or more of NMDs 512, 514, and 516. For example, any one or more (or perhaps all) of NMDs 512-16, PBDs 532-38, and/or CR 522 may be voice-enabled devices (VEDs).

The NMDs 512, 514, and 516 may be part of a local area network, and the communication path 542 may include an access point that links the local area network of the NMDs 512, 514, and 516 to the computing device 504 over a WAN (communication path not shown). Likewise, each of the NMDs 512, 514, and 516 may communicate with each other via such an access point.

Similarly, CR 522 and PBDs 532, 534, 536, and 538 may be part of a local area network and/or a local playback network as discussed in previous sections, and the communication path 544 may include an access point that links the local area network and/or local playback network of CR 522 and PBDs 532, 534, 536, and 538 to the computing device 506 over a WAN. As such, each of the CR 522 and PBDs 532, 534, 536, and 538 may also communicate with each over such an access point.

In one example, communication paths 542 and 544 may comprise the same access point. In an example, each of the NMDs 512, 514, and 516, CR 522, and PBDs 532, 534, 536, and 538 may access the cloud network 502 via the same access point for a household.

As shown in FIG. 5, each of the NMDs 512, 514, and 516, CR 522, and PBDs 532, 534, 536, and 538 may also directly communicate with one or more of the other devices via communication means 546. Communication means 546 as described herein may involve and/or include one or more forms of communication between the devices, according to one or more network protocols, over one or more types of networks, and/or may involve communication via one or more other network devices. For instance, communication means 546 may include one or more of for example, Bluetooth™ (IEEE 802.15), NFC, Wireless direct, and/or Proprietary wireless, among other possibilities.

In one example, CR 522 may communicate with NMD 512 over Bluetooth™, and communicate with PBD 534 over another local area network. In another example, NMD 514 may communicate with CR 522 over another local area network, and communicate with PBD 536 over Bluetooth™. In a further example, each of the PBDs 532, 534, 536, and 538 may communicate with each other according to a spanning tree protocol over a local playback network, while each communicating with CR 522 over a local area network, different from the local playback network. Other examples are also possible.

In some cases, communication means between the NMDs 512, 514, and 516, CR 522, and PBDs 532, 534, 536, and 538 may be different (or perhaps change) depending on types of communication requirements between the devices, network conditions, and/or latency demands. For instance, communication means 546 may be used when NMD 516 is first introduced to the household with the PBDs 532, 534, 536, and 538. In one case, the NMD 516 may transmit identification information corresponding to the NMD 516 to PBD 538 via NFC, and PBD 538 may in response, transmit local area network information to NMD 516 via NFC (or some other form of communication). However, once NMD 516 has been configured within the household, communication means between NMD 516 and PBD 538 may change. For instance, NMD 516 may subsequently communicate with PBD 538 via communication path 542, the cloud network 502, and communication path 544. In another example, the NMDs and PBDs may never communicate via local communications means 546. In a further example, the NMDs and PBDs may communicate primarily via local communications means 546. Other examples are also possible.

In an illustrative example, NMDs 512, 514, and 516 may be configured to receive voice inputs to control PBDs 532, 534, 536, and 538. The available control commands may include any media playback system controls previously discussed, such as playback volume control, playback transport controls, music source selection, and grouping, among other possibilities. In one instance, NMD 512 may receive a voice input to control one or more of the PBDs 532, 534, 536, and 538. In response to receiving the voice input, NMD 512 may transmit via communication path 542, the voice input to computing device 504 for processing. In one example, the computing device 504 may convert the voice input to an equivalent text command, and parse the text command to identify a command. Computing device 504 may then subsequently transmit the text command to the computing device 506, and computing device 506 in turn may then control one or more of PBDs 532-538 to execute the command. In another example, the computing device 504 may convert the voice input to an equivalent text command, and then subsequently transmit the text command to the computing device 506. The computing device 506 may then parse the text command to identify one or more playback commands, and then computing device 506 may additionally control one or more of PBDs 532-538 to execute the command.

For instance, if the text command is "Play 'Track 1' by 'Artist 1' from 'Streaming Service 1' in 'Zone 1'," The computing device 506 may identify (i) a URL for "Track 1" by "Artist 1" available from "Streaming Service 1," and (ii) at least one playback device in "Zone 1." In this example, the URL for "Track 1" by "Artist 1" from "Streaming Service 1" may be a URL pointing to computing device 508, and "Zone 1" may be the bonded zone 530. As such, upon identifying the URL and one or both of PBDs 536 and 538, the computing device 506 may transmit via communication path 544 to one or both of PBDs 536 and 538, the identified URL for playback. One or both of PBDs 536 and 538 may responsively retrieve audio content from the computing device 508 according to the received URL, and begin playing "Track 1" by "Artist 1" from "Streaming Service 1."

One having ordinary skill in the art will appreciate that the above is just one illustrative example, and that other implementations are also possible. In one case, operations performed by one or more of the plurality of network devices 500, as described above, may be performed by one or more other devices in the plurality of network devices 500. For instance, the conversion from voice input to the text command may be alternatively, partially, or wholly performed by another device or devices, such as CR 522, NMD 512, computing device 506, PBD 536, and/or PBD 538. Analogously, the identification of the URL may be alternatively, partially, or wholly performed by another device or devices, such as NMD 512, computing device 504, PBD 536, and/or PBD 538.

f. Example Network Microphone Device

Figure 6:
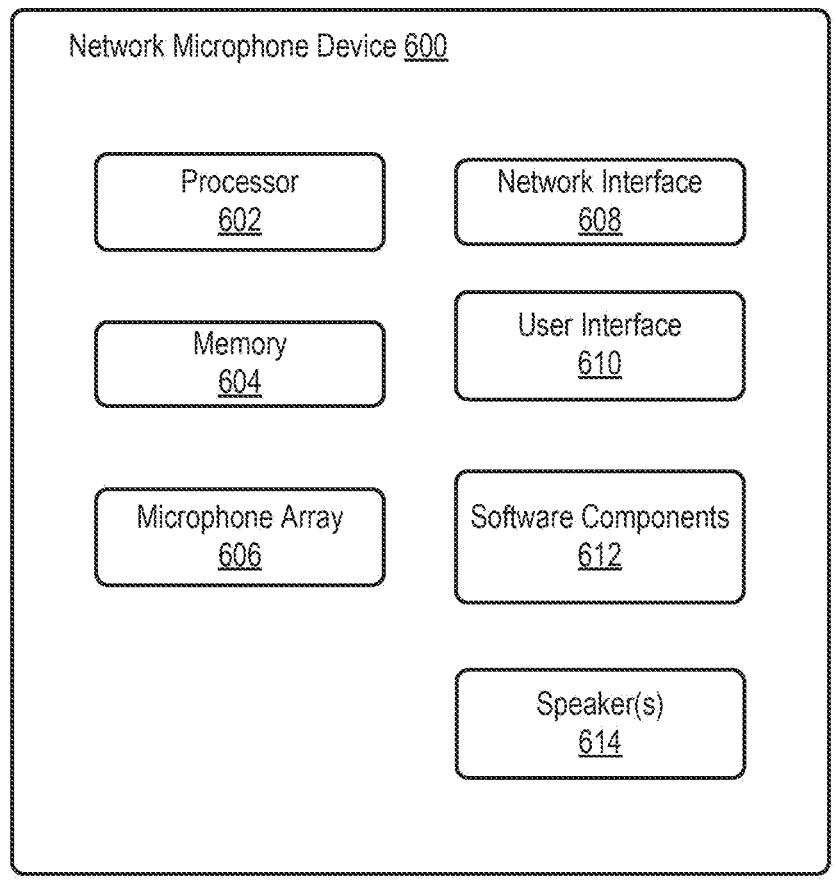
FIG. 6 is a functional block diagram of a network microphone device.

FIG. 6 shows a function block diagram of an example network microphone device 600 that may be configured to be one or more of NMDs 512, 514, and 516 of FIG. 5, and/or any of the VEDs disclosed and described herein. As shown, the network microphone device 600 includes one or more processors 602, tangible, non-transitory computer-readable memory 604, a microphone array 606 (e.g., one or more microphones), a network interface 608, a user interface 610, software components 612, and speaker(s) 614. One having ordinary skill in the art will appreciate that other network microphone device configurations and arrangements are also possible. For instance, network microphone devices may alternatively exclude the speaker(s) 614 or have a single microphone instead of microphone array 606.

The one or more processors 602 may include one or more processors and/or controllers, which may take the form of a general or special-purpose processor or controller. For instance, the one or more processors 602 may include microprocessors, microcontrollers, application-specific integrated circuits, digital signal processors, and the like. The tangible, non-transitory computer-readable memory 604 may be data storage that can be loaded with one or more of the software components executable by the one or more processors 602 to perform those functions. Accordingly, memory 604 may comprise one or more non-transitory computer-readable storage mediums, examples of which may include volatile storage mediums such as random access memory, registers, cache, etc. and non-volatile storage mediums such as read-only memory, a hard-disk drive, a solid-state drive, flash memory, and/or an optical-storage device, among other possibilities.

The microphone array 606 may be a plurality of microphones arranged to detect sound in the environment of the network microphone device 600. Microphone array 606 may include any type of microphone now known or later developed such as a condenser microphone, electret condenser microphone, or a dynamic microphone, among other possibilities. In one example, the microphone array may be arranged to detect audio from one or more directions relative to the network microphone device. The microphone array 606 may be sensitive to a portion of a frequency range. In one example, a first subset of the microphone array 606 may be sensitive to a first frequency range, while a second subset of the microphone array may be sensitive to a second frequency range. The microphone array 606 may further be arranged to capture location information of an audio source (e.g., voice, audible sound) and/or to assist in filtering background noise. Notably, in some embodiments the microphone array may consist of only a single microphone, rather than a plurality of microphones.

The network interface 608 may be configured to facilitate wireless and/or wired communication between various network devices, such as, in reference to FIG. 5, CR 522, PBDs 532-538, computing devices 504-508 in cloud network 502, and other network microphone devices, among other possibilities. As such, network interface 608 may take any suitable form for carrying out these functions, examples of which may include an Ethernet interface, a serial bus interface (e.g., FireWire, USB 2.0, etc.), a chipset and antenna adapted to facilitate wireless communication, and/or any other interface that provides for wired and/or wireless communication. In one example, the network interface 608 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on).

The user interface 610 of the network microphone device 600 may be configured to facilitate user interactions with the network microphone device. In one example, the user interface 610 may include one or more of physical buttons, graphical interfaces provided on touch sensitive screen(s) and/or surface(s), among other possibilities, for a user to directly provide input to the network microphone device 600. The user interface 610 may further include one or more of lights and the speaker(s) 614 to provide visual and/or audio feedback to a user. In one example, the network microphone device 600 may further be configured to playback audio content via the speaker(s) 614.

III. Example Systems for Controlling Multi-Site Media Playback Systems

In previous media playback systems, media playback devices were intended to remain stationary in a user's home or workplace. When media playback devices were moved from one location to another (e.g., from a user's home to the user's workplace), previous settings on the playback devices might not have carried over, and the user might have had to set up a new media playback system at the new location. The media playback devices at the user's home might not have been able to interact with the media playback devices at the user's workplace. Users have the ability to control their media playback system while connected to networks other than the network to which the media playback system is connected via the cloud. However, this development has presented unique technical challenges for controlling media playback systems with media playback devices connected in multiple locations. These technical challenges, among others, may include a cloud server being unable to distinguish which media playback devices are connected at which locations.

For example, if a first media playback device and a second media playback device are first powered on and initialized at a first location, the cloud server assigns a system identifier to the first media playback device and the second media playback device. The system identifier indicates that the first media playback device and the second media playback device are members of a single media playback system, and connected to the cloud server. However, if the second media playback device is subsequently moved to a second location, the second media playback device retains the same system identifier but might be unable to communicate with the first media playback device because the two devices are on different local area networks. Accordingly, if the cloud server sends a command to implement a configuration change to devices associated with the system identifier, one of the first media playback device or the second media playback device receives and handles the request, but the other media playback device might not receive the command from the cloud server after having been moved to the second location. This may result in an undesirable outcome if a user was attempting to issue the configuration change to a specific media playback device or both the first media playback device and the second media playback device. For example, if a user updates a playlist for the media playback system via the cloud server, one of the first or second media playback devices might update the playlist but the other of the first or second playback devices may not receive the playlist update command from the cloud server because of the first and second playback devices being connected to different local networks in different locations.

To overcome this problem, some embodiments include the cloud server assigning a subsystem identifier to the first media playback device and second media playback device. The subsystem identifier is a site-specific identifier that provides a cloud server the ability to identify which media playback devices are connected to which local networks, where each location has a separate local network. The cloud server updates the subsystem identifier for the various media playback devices when they move locations (including returning to a previous location). Thus, the embodiments described herein facilitate the control of media playback devices that are in different locations and/or connected to different networks.

Figure 7:
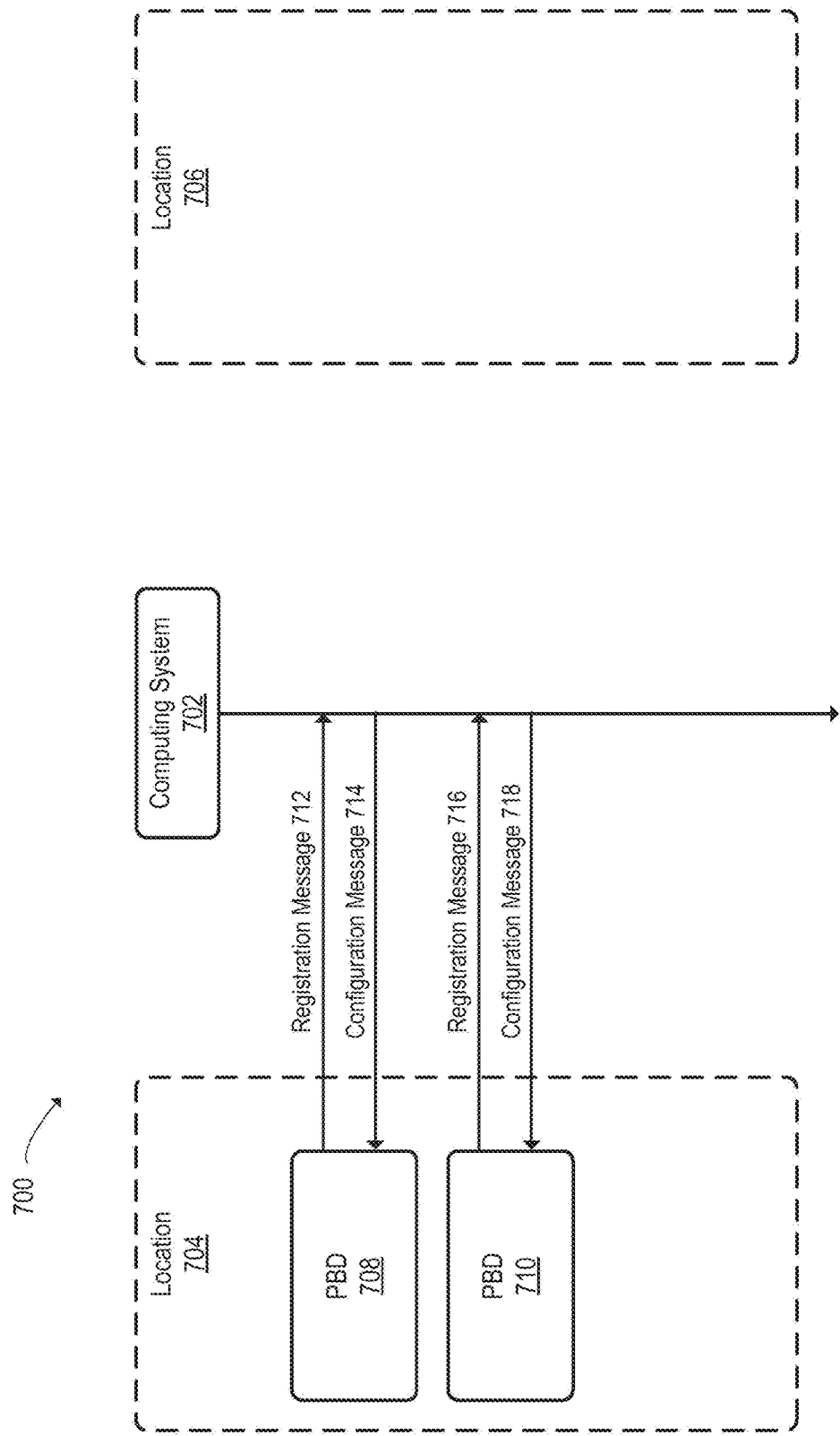
FIG. 7 is a communication flow diagram of an example media playback system.

FIG. 7 is a communication flow diagram of an example media playback system 700 that includes PBDs 708 and 710 at location 704 that are connected to computing system 702. The communication flow shown in FIG. 7 depicts the communication between PBDs 708 and 710 upon initialization (e.g., when PBDs 708 and 710 are powered on and connected to the Internet for the first time). While the media playback devices shown in FIG. 7 are PBDs, any networked device may be used (e.g., NMDs and/or VEDs).

PBDs 708 and 710 are connected to computing system 702 through any of communication means 546, as described above with respect to FIG. 5. For example, PBD 708 may be connected to computing system 702 over the Internet via a router. The router may include a wired or wireless network router, such as network router 130 as described above with respect to FIG. 1. Computing system 702 includes a cloud-based server system configured to remotely communicate with PBDs 708 and 710, such as cloud network 502 as described above with respect to FIG. 5.

In some embodiments, PBDs 708 and 710 are powered on and connected to the Internet. Once connected, PBDs 708 and 710 begin communicating with computing system 702. In operation, PBD 708 may transmit registration message 712 to computing system 702. Registration message 712 includes information pertaining to PBD 708, such as parameters that include a cached system identifier, a cached subsystem identifier, a cached user identifier, and a cached location identifier. The parameters may be stored in a settings file in the memory of PBD 708.

The system identifier is a unique short string that identifies the "household" to which PBD 708 belongs. A household may refer to the media playback system as a whole. Thus, the system identifier may indicate membership as part of the media playback system. The system identifier may be computer generated to ensure it is unique. U.S. Pat. No. 8,326,951 contains further discussion with respect to system identifiers, the entire contents of which is incorporated by reference herein.

The subsystem identifier includes a semi-persistent unique identifier that corresponds to a partition (e.g., location) of the media playback system that has been assigned the system identifier. For example, if the media playback system is split between two locations, media playback devices that are connected in a first location are assigned a first subsystem identifier and media playback devices that are connected in a second location are assigned a second subsystem identifier. The subsystem identifier is a unique string or integer. If PBD 708 has not previously had a subsystem identifier assigned to it on initialization, the subsystem identifier is a placeholder string with a null value (e.g., "NULL") or no value (e.g., " "). As discussed further below, computing system 702 receives this placeholder string and assigns PBD 708 a new subsystem identifier based on the location to which it is connected.

The user identifier is a short string that identifies a user or family of users that can access the media playback system. In some embodiments, the user identifier relates to the name of the user (e.g., "John") or can be a string of alphanumeric or other characters. In other embodiments, the user identifier relates to a user profile with permission to add additional media playback devices and/or services to the media playback system. A user profile relates to an account linked to a particular user (e.g., "Mark's Profile" or "Dad's Profile").

The location identifier can be a property that pertains to the local area network (LAN) to which PBD 708 is connected. For example, the location identifier can be any property discoverable by a player that is unique to the LAN to which PBD 708 is connected and semi-persistent. Examples of a location identifier include a network identifier associated with the router to which PBD 708 is connected, a Dynamic Host Configuration Protocol (DHCP) server media access control (MAC) address, a DHCP server MAC address with the addition of the network address portion of PBD 708's local IP address, and/or a wireless beacon (e.g., a globally unique wireless beacon).

In some embodiments, after PBD 708 transmits the registration message, computing system 702 receives the registration message. Computing system 702 can store the parameters contained in the registration message in a file stored on computing system 702. This may be beneficial because it provides computing system 702 with the ability to track active and previously used identifiers. Computing system 702 then determines if the system identifier, user identifier, and location identifier already exist on another media playback device connected to media playback system 700. Computing system 702 can determine if the system identifier, user identifier, and location identifier exist by (i) searching the system identifier, user identifier, and location identifiers of all other media playback devices currently connected to media playback system 700, (ii) searching a database containing the previously used system identifier, user identifier, and location identifiers of media playback devices connected to media playback system 700, and/or (iii) searching a file stored on computing system 702 that contains the previously registered system identifier, user identifier, and location identifiers of media playback devices connected to media playback system 700. If the combination of system identifier, user identifier, and location identifier does not already exist on another media playback device, then computing system 702 sends a configuration message to PBD 708 that contains a new subsystem identifier. If the combination of system identifier, user identifier, and location identifier does exist on another media playback device, then computing system 702 sends a configuration message to PBD 708 that contains a subsystem identifier that is the same as the other media playback device that has the same combination.

The value of the new subsystem identifier may be different for every media playback device that is connected to media playback system 700 with a different combination of system identifier, subsystem identifier, user identifier, and location identifier. In some embodiments, the value for the subsystem identifier can be generated based on another identifier associated with the media playback system (e.g., user identifier, system identifier, location identifier). The subsystem identifier can be generated based on a combination of the generated identifier and another identifier associated with the media playback system (e.g., user identifier, system identifier, location identifier). For example, the value for the subsystem identifier may be a hash of the system identifier combined with the system identifier. Hashing the system identifier and combining the hash with the system identifier may be a beneficial way to set a unique value for the subsystem identifier. In other embodiments, the value of the new subsystem identifier may be an integer that is one value higher sequentially from the existing subsystem identifiers associated with the media playback system.

For example, if PBD 708 is the first media playback device powered on and connected to media playback system 700, computing system 702 sends PBD 708 a configuration message containing a first subsystem identifier. If PBD 710 is subsequently connected to media playback system 700 at a different location, computing system 702 assigns PBD 710 a second subsystem identifier.

In operation, PBD 708 may be powered on and connected to the Internet. PBD 708 sends registration message 712 to computing system 702. Registration message 712 contains a system identifier, subsystem identifier with a null initial value, a user identifier, and a location identifier. Computing system 702 then determines that no other media playback devices are connected to media playback system 700. In response to this determination, computing system 702 sends configuration message 714 to PBD 708. Configuration message 714 contains a first sub system identifier.

Subsequently, PBD 710 is powered on and connected to the Internet. PBD 710 sends registration message 716 to computing system 702. Registration message 716 contains a system identifier, subsystem identifier with a null initial value, a user identifier, and a location identifier. Computing system 702 then determines that PBD 710 has the same system identifier, user identifier, and a location identifier as PBD 708. Upon determining that PBDs 708 and 710 have the same system identifier, user identifier, and a location identifier, computing system 702 transmits configuration message 718 to PBD 710. Configuration message 718 contains a subsystem identifier identical to the subsystem identifier in configuration message 714 (e.g., the first subsystem identifier).

In some scenarios, one or both of PBDs 708 and 710 may be moved to a different location. This may be beneficial when a user wants to set up one or more playback devices in one location (e.g., at home) and one or more playback devices in another location (e.g., at work). In line with the discussion above, this movement of media playback devices was a potential problem in conventional media playback systems due to an inability for a computing system to discern which media playback devices needed to execute which commands.

Figure 8:
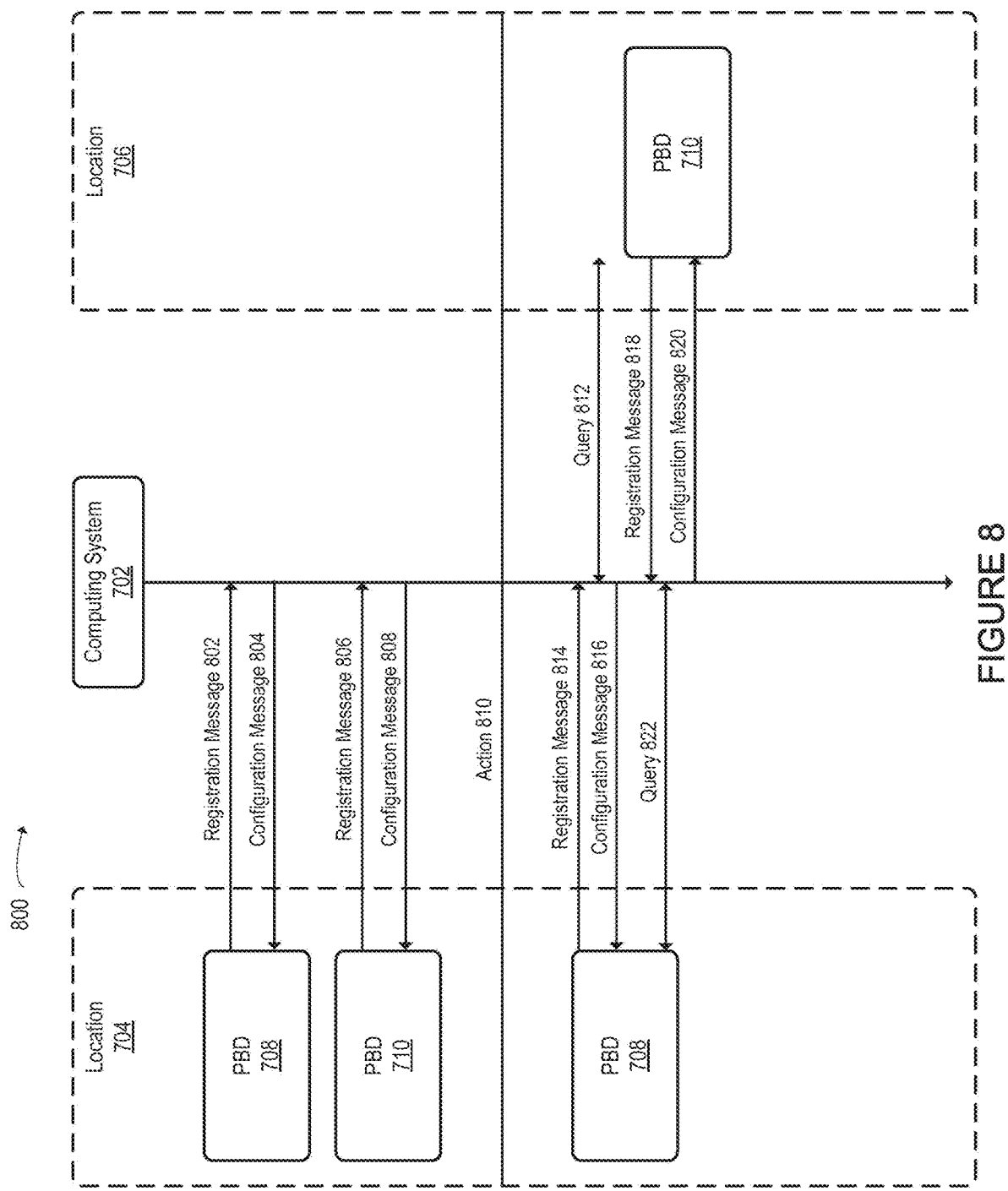
FIG. 8 is a communication flow diagram of an example media playback system.

FIG. 8 is a communication flow diagram of an example media playback system 800 that includes PBDs 708 and 710 at location 704 that are initially connected to computing system 702. FIG. 8 further includes PBD 708 at location 704 connected to computing system 702 and PBD 710 at location 706 connected to computing system 702 after an action 810 takes place.

PBDs 708 and 710 are connected to computing system 702 in a similar manner as in media playback system 700 as described in FIG. 7. PBDs 708 and 710 are configured to send registration messages 802, 806, 814, and 818, as well as receive configuration messages 804, 808, 816, and 820 and return queries 812 and 822. As discussed above, registration messages 802, 806, 814, and 818 are messages configured to connect PBDs 708 and 710 to computing system 702, and may contain information about PBDs 708 and 710 such as parameters that include a cached system identifier, subsystem identifier, user identifier, and location identifier. Configuration messages 804, 808, 816, and 820 are messages configured to cause PBDs 708 and 710 to update their subsystem identifier.

Action 810 includes an action on one or both of PBDs 708 and 710. In some embodiments, action 810 includes a physical relocation of PBD 710 to location 706. In other embodiments, action 810 includes powering off PBD 708 and/or 710.

Computing system 702 in media playback system 800 can be configured in the same or similar way as in media playback system 700. In some embodiments, computing system 702 is configured to (i) receive registration messages 802, 806, 814, and 818, (ii) transmit configuration messages 804, 808, 816, and 820, and (iii) perform queries 812 and 822.

Registration messages 802, 806, 814, and 818 contain the same or similar information as registration messages 712 and 716 in FIG. 7. Configuration messages 804, 808, 816, and 820 contain the same or similar information as configuration messages 714 and 718.

Queries 812 and 822 are location verification messages configured to verify that PBD 708 and/or PBD 710 are still able to communicate with computing system 702. Queries 812 and 822 contain expected information about PBDs 708 and/or 710, such as a multi-character string that corresponds to the state of PBDs 708 and/or 710. Computing system 702 sends queries 812 and 822 in response to receiving a registration message from a newly connected media playback device or from an existing media playback device connected to a new location.

In operation, after PBD 708 is powered on and connected to the Internet, PBD 708 sends registration message 802 to computing system 702. The registration message 802 can include a cached system identifier, a cached subsystem identifier with a null value, a cached user identifier, and a cached location identifier. As previously discussed, the cached subsystem identifier has a null value because computing system 702 has not yet assigned a subsystem identifier to PBD 708. Computing system 702 receives registration message 802 and determines whether any other media playback devices that are in communication with computing system 702 are using the same system identifier, same user identifier, and/or same location identifier included in the registration message 802. Upon determining that no other media playback devices in communication with the computing system 702 are using the same system identifier, same user identifier, and same location identifier, computing system 702 sends configuration message 804 to PBD 708. In some embodiments, configuration message 804 assigns PBD 708 a first subsystem identifier.

If/when PBD 710 is subsequently powered on and connected to the Internet, PBD 710 sends registration message 806 to computing system 702. Registration message 806 includes one or more of a cached system identifier, a subsystem identifier with a null value, a user identifier, and a location identifier. The subsystem identifier in registration message 806 has a null value because computing system 702 has not previously assigned a subsystem identifier to PBD 710. Computing system 702 receives registration message 806 and determines whether any other media playback devices in communication with the computing system 702 are configured with one or more of the system identifier, user identifier, and location identifier contained in registration message 806. Upon determining that PBD 708 is using one or more of the system identifier, user identifier, and location identifier, computing system 702 sends configuration message 808 to PBD 710. In some embodiments, configuration message 808 assigns PBD 710 the first subsystem identifier (which is identical to the subsystem identifier assigned to PBD 708).

After this registration and configuration takes place and the media playback system is configured for operation at location 704 (e.g., the user's home), the user may move one of the playback devices to a different location (e.g., the user's office). This movement from a first location to a second location is illustrated as action 810 in FIG. 8. In FIG. 8, action 810 corresponds to PBDs 708 and 710 being powered off, and PBD 710 being moved and/or relocated to location 706.

PBD 708 is subsequently re-powered on and re-connected to the Internet via a router at location 704. PBD 708 then determines that its location identifier has changed. For example, PBD 708 determines that it is no longer connected to the router at location 704 by (i) determining a GPS coordinate associated with PBD 708 has changed above a threshold value or (ii) the IP address of PBD 708 has changed due to a change in DHCP. In response to determining that its location identifier has changed, PBD 708 sends registration message 814 to computing system 702. Registration message 814 contains parameters including the same cached system identifier, user identifier, and location identifier as in registration message 802, along with the cached first subsystem identifier (which was previously assigned by computing system 702). Computing system 702 receives registration message 814 and, in response to receiving registration message 814, sends query 812 to any media playback devices connected at location 706 to determine whether any media playback devices have the same parameters as PBD 708. In response to determining that no devices at location 706 have the same parameters as PBD 708, computing system 702 sends configuration message 816 to PBD 708. Configuration message 816 contains the same parameters as registration message 814, including the cached first subsystem identifier.

Next, PBD 710 is re-powered on and re-connected to the Internet via a router at location 706. PBD 710 sends registration message 818 to computing system 702. Registration message 818 contains parameters including the same cached system identifier, user identifier, and location identifier as in registration message 806, along with the cached first subsystem identifier (which was previously assigned by computing system 702). Computing system 702 receives registration message 818 and, in response to receiving registration message 818, sends query 822 to PBD 708 to determine that PBD 708 is still active at location 704. PBD 708 receives query 822 and responds with its parameters, indicating that PBD 708 is powered on and has been assigned the first subsystem identifier. Upon receiving a response to query 822, computing system sends configuration message 820 to PBD 710. Configuration message 820 contains a new subsystem identifier. The new subsystem identifier can be a second subsystem identifier that is different from the first subsystem identifier and generated in the same way as the first subsystem identifier.

In some embodiments, after PBDs 708 and 710 are connected and assigned their respective subsystem identifiers, computing system 702 may receive a request directed to media playback devices active at location 706. This may also be a request directed to media playback devices with the second subsystem identifier. The request may be a command to change a configuration setting of the devices connected at location 706, such as a command to change the media playback system volume or to pause media playback. In response to receiving the request, computing system 702 causes PBD 710, and any other media playback devices connected to location 706 but not shown in FIG. 8, to process the request. As discussed above, this may be beneficial because it may avoid the problem of computing system 702 accidentally causing media playback devices with the first subsystem identifier to carry out the request directed only towards media playback devices with the second subsystem identifier.

In some embodiments, PBDs 708 and 710 are powered on and initialized at a first location, then powered off. PBD 710 is subsequently moved, powered on, and connected at a second location. In these embodiments, computing system 702 assigns the subsystem identifier that was associated with the first location to the second. This may be beneficial because it is unknown whether media playback devices will be connected at the first location, and thus it may be more efficient to only have subsystem identifiers that are associated with locations that computing system 702 expects media playback devices to be connected.

Figure 9:
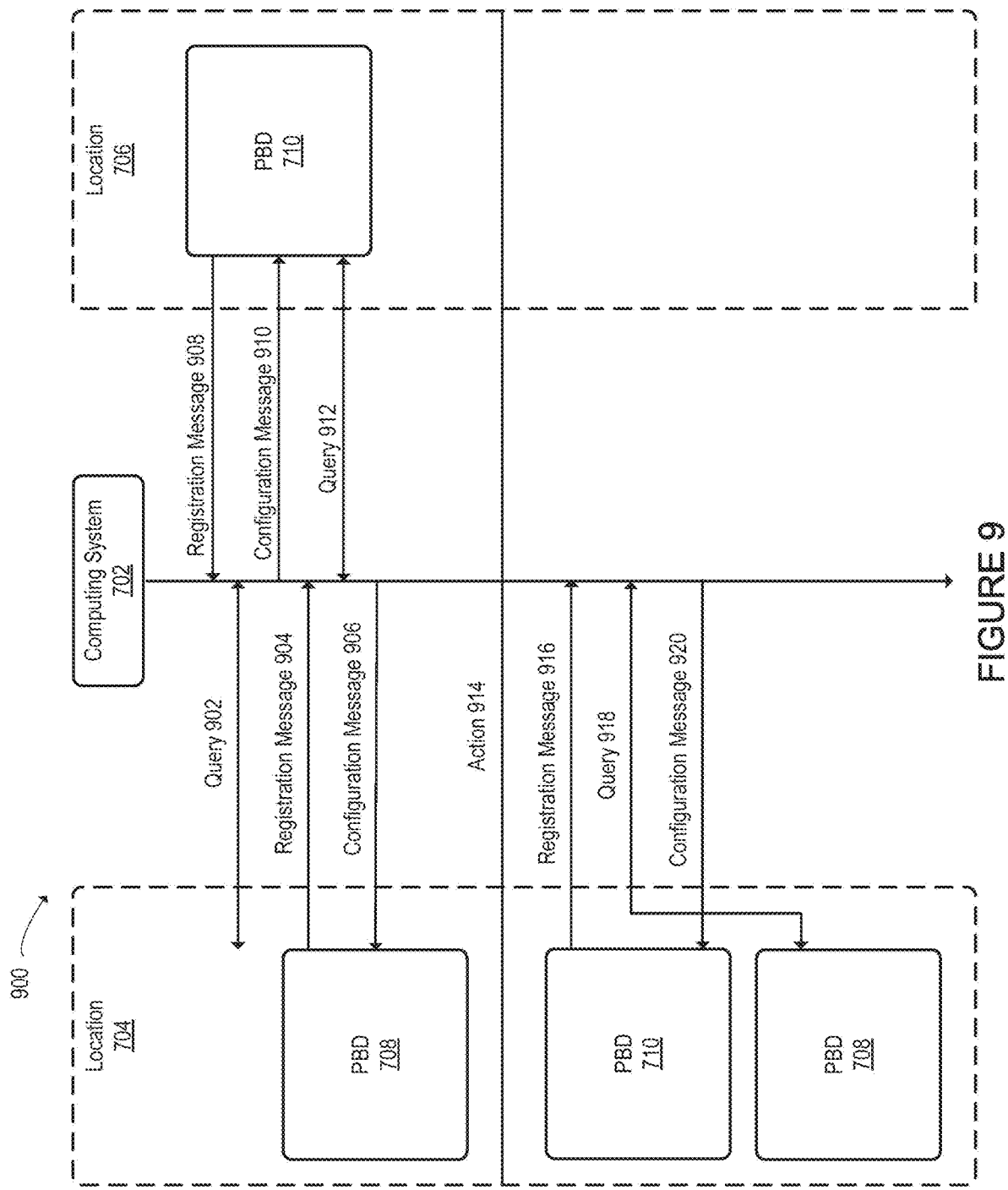
FIG. 9 is a communication flow diagram of an example media playback system.

FIG. 9 is a communication flow diagram of an example media playback system 900 that includes PBD 708 connected to computing system 702 via the Internet at location 704 and PBD 710 connected to computing system 702 via the Internet at location 706. Although not shown, PBDs 708 and 710 were previously connected to computing system 702 at location 704 and powered off. PBD 710 was then moved to location 706 and powered on. When PBDs 708 and 710 were powered on and connected to computing system 702, computing system 702 assigned PBDs 708 and 710 a first subsystem identifier.

In operation, PBD 710, upon being connected to the Internet, sends registration message 908 to computing system 702. Registration message 908 contains parameters that include a system identifier, the first subsystem identifier, a user identifier, and a location identifier. Computing system 702 receives registration message 908 and sends query 902 to location 704, which is where PBD 710 was previously connected. Upon determining that PBD 708 is no longer connected at location 704 (since it is powered off), computing system 702 sends configuration message 910 to PBD 710. Configuration message 910 contains parameters configured to assign PBD 710 a subsystem identifier with a value 0.

PBD 708 is then powered on and connected to the Internet. PBD 708 sends registration message 904 to computing system 702. Registration message 904 contains parameters including a system identifier, the first subsystem identifier, a user identifier, and a location identifier. Computing system 702 receives registration message 904 and sends query 912 to location 706 to (i) determine whether PBD 710 is still connected at location 706 and (ii) retrieve the subsystem identifier assigned to PBD 710. Upon determining that PBD 710 is still connected at location 706 and that PBD 710 has the first subsystem identifier, computing system 702 sends configuration message 906 to PBD 708. Configuration message 906 contains parameters configured to assign PBD 708 a second subsystem identifier, which indicates it is in a different location than PBD 710.

Action 914 is then performed. In FIG. 9, action 914 includes powering off and moving PBD 710 to location 704.

PBD 710 is then powered on and connected to the Internet via a router at location 704. Upon being powered on, PBD 710 sends registration message 916 to computing system 702. Registration message 916 contains parameters that include a system identifier, the first subsystem identifier, a user identifier, and a location identifier. In response to receiving registration message 916, computing system 702 sends query 918 to PBD 708 to (i) determine whether PBD 708 is still connected at location 704 and (ii) retrieve the subsystem identifier assigned to PBD 708. Upon determining that PBD 708 is still connected at location 704 and that PBD 708 has the first subsystem identifier, computing system 702 sends configuration message 920 to PBD 710. Configuration message 920 contains parameters configured to assign PBD 710 the second subsystem identifier, which indicates it is now in the same location as PBD 710. In this scenario, while the first subsystem identifier is lost, the second subsystem identifier has all of the previous parameters associated with the first subsystem identifier.

In some embodiments, a third media playback device (not shown) may be added to media playback system 900. The third media playback device is powered on and connected to the Internet via a router at location 706. The third media playback device sends a registration message to computing system 702. The registration contains the same or similar parameters as registration messages 712, 716, 802, 806, 814, 818, 904, 908, and 916 as described in FIGS. 7-9. Upon receiving the registration message, computing system 702 queries the network at location 704 to (i) determine whether PBDs 708 and 710 are still connected at location 704 and (ii) retrieve the second subsystem identifier that was assigned to PBDs 708 and 710 (which are identical). Computing system 702 then sends a configuration message to the third playback device. The configuration message contains the same or similar parameters to configuration messages 714, 718, 804, 808, 816, 820, 906, 910, and 920 as described in FIGS. 7-9. The configuration message is configured to assign the third media playback device the first subsystem identifier. Computing system 702 assigns the third media playback device the first subsystem identifier because the first subsystem identifier is not being used. Computing system 702 also sends a command to cause the third media playback device to process any requests that were previously directed at the media playback devices that were assigned the first subsystem identifier. This may be beneficial because it may allow a user to avoid having to reconfigure new media playback devices that are added to a previously configured location.

In some embodiments, when PBDs 708 and 710 are connected at different locations, such as location 704 and 706, the third media playback device may be powered on and connected at a third location (not shown). In these embodiments, the configuration message sent by computing system 702 contains a third subsystem identifier generated by computing system 702. The third subsystem identifier can be generated by the computing system 702 in a similar manner to the first subsystem identifier.

In some embodiments, PBDs 708 or 710, after receiving a configuration message containing a subsystem identifier from computing device 702, may store the subsystem identifier in a settings file. The settings file is stored in memory 206 on PBDs 708 and 710, as described with respect to FIG. 2.

In some embodiments, after PBDs 708 and 710 are powered on and connected to computing system 702, PBDs 708 and 710 may transmit an advertisement message to computing system 702. The advertisement message contains PBDs 708 or 710's respective subsystem identifier. This may be beneficial because computing system 702 may receive the advertisement message from PBDs 708 and/or 710 and determine the subsystem identifier assigned to each of PBDs 708 and 710. In some embodiments, the advertisement message may include the subsystem identifier that is stored in the settings file of PBDs 708 and/or 710.

In some embodiments, a DCHP change may occur at location 704 and/or location 706. This change may occur due to a connection loss at the router to which PBDs 708 and/or 710 are connected. Either or both of PBDs 708 and 710 can detect the DHCP change. In scenarios where both PBDs 708 and 710 detect a DHCP change, PBDs 708 and 710 send a re-registration message to computing system 702. The re-registration message includes parameters including the same system identifier, subsystem identifier, and user identifier, but may include a different location identifier. Computing system 702 receives the re-registration message and sends a re-configuration message with the same parameters back to PBDs 708 and 710. The re-configuration message includes a message configured to assign PBDs 708 and 710 a subsystem identifier with the same value as the re-registration message. This may be beneficial because it results in computing system 702 having an updated location identifier for PBDs 708 and 710.

In some embodiments, only one of PBDs 708 and 710 detects the DHCP change. For example, PBD 708 may detect the DHCP change, while PBD 710 does not detect the DHCP change. In this scenario, PBD 708 sends a message to computing system 702. The message includes parameters including the same system identifier, subsystem identifier, and user identifier, but may include a different location identifier. Computing system 702 receives the message and sends a message with the same parameters back to PBD 708. While PBD 708 is sending the message and receiving the message, PBD 708 is sending replicated copies of the re-registration message and the re-configuration message to PBD 710. In response to receiving the replicated messages from PBD 708, PBD 710 sends a re-registration message to computing system 702. Computing system 702 receives the re-registration message and sends a re-configuration message back to PBD 710. In response to receiving the re-configuration message from computing system 702, PBD 710 updates its DHCP to match the DHCP of PBD 708.

V. Example Methods for Controlling Multi-site Media Playback Systems

Figure 10:
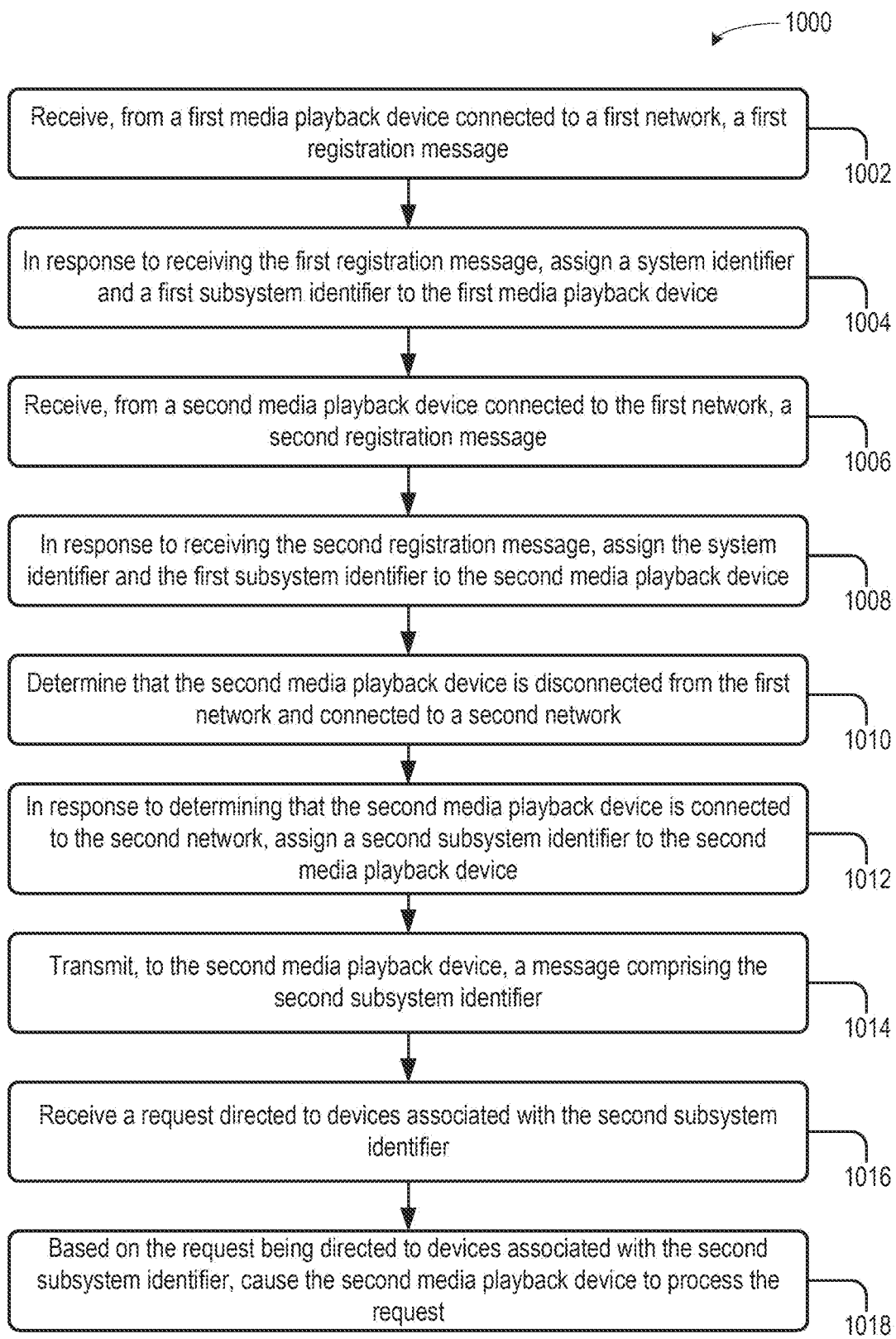
FIG. 10 is a flowchart of an example method.

FIG. 10 shows an example embodiment of a method 1000 that can be implemented by a media playback system, for example, the media playback system 700 of FIG. 7, the media playback system 800 of FIG. 8, and/or the media playback system 900 of FIG. 9.

Various embodiments of method 1000 include one or more operations, functions, and actions illustrated by blocks 1002 through 1018. Although the blocks are illustrated in sequential order, these blocks may also be performed in parallel, and/or in a different order than the order disclosed and described herein. Also, the various blocks may be combined into fewer blocks, divided into additional blocks, and/or removed based upon a desired implementation.

In addition, for the method 1000 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable media, for example, such as tangible, non-transitory computer-readable media that stores data for short periods of time like register memory, processor cache, and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1000 and other processes and methods disclosed herein, each block in FIG. 10 may represent circuitry that is wired to perform the specific logical functions in the process.

Method 1000 begins at block 1002, which includes a computing system receiving, from a first media playback device connected to a first network, a first registration message.

At block 1004, method 1000 includes in response to receiving the first registration message, assigning a system identifier and a first subsystem identifier to the first media playback device. In some embodiments, the system identifier is associated with the computing system, and the first subsystem identifier is associated with the system identifier.

At block 1006, method 1000 includes receiving, from a second media playback device connected to the first network, a second registration message.

At block 1008, method 1000 includes, in response to receiving the second registration message, assigning the system identifier and the first subsystem identifier to the second media playback device.

At block 1010, method 1000 includes determining that the second media playback device is disconnected from the first network and connected to a second network.

At block 1012, method 1000 includes, in response to determining that the second media playback device is connected to the second network, assigning a second subsystem identifier to the second media playback device. In some embodiments, the second subsystem identifier is associated with the system identifier.

At block 1014, method 1000 includes transmitting, to the second media playback device, a message comprising the second subsystem identifier.

At block 1016, method 1000 includes receiving a request directed to devices associated with the second subsystem identifier.

At block 1018, method 1000 includes, based on the request being directed to devices associated with the second subsystem identifier, causing the second media playback device to process the request.

In some embodiments, determining that the second media playback device is disconnected from the first network and connected to a second network may involve receiving, from the second media playback device on the second network, a third registration message.

In some embodiments, determining that the second media playback device is disconnected from the first network and connected to a second network includes (i) querying the first network to determine whether the second media playback device is a member of the first network, and (ii) based on the determination that the second media playback device is not a member of the first network, querying the second network to determine whether the second media playback device is a member of the second network.

Some embodiments further include (i) determining that the second media playback device is disconnected from the second network and connected to the first network, and (ii) in response to determining the second media playback device is connected to the first network, assigning the first subsystem identifier to the second media playback device.

In some embodiments, the computing system has one associated system identifier for the computing system. The system identifier has an associated subsystem identifier for each media playback device connected to the computing system.

In some embodiments, assigning the first subsystem identifier includes (i) determining whether the first media playback device has a cached subsystem identifier, and (ii) in response to determining that the first media playback device has a pre-existing subsystem identifier, assigning the cached subsystem identifier as the first subsystem identifier to the first media playback device.

In some embodiments, the request includes a command to change a configuration setting of the devices associated with the second subsystem identifier and causing the second media playback device to process the request includes implementing the configuration setting on the second media playback device.

Some embodiments further include (i) receiving, from a third media playback device connected to the second network, a third registration message, (ii) in response to receiving the third registration message, transmitting, to the third media playback device, a message comprising the second subsystem identifier, and (iii) causing the third media playback device to process the request.

Figure 11:
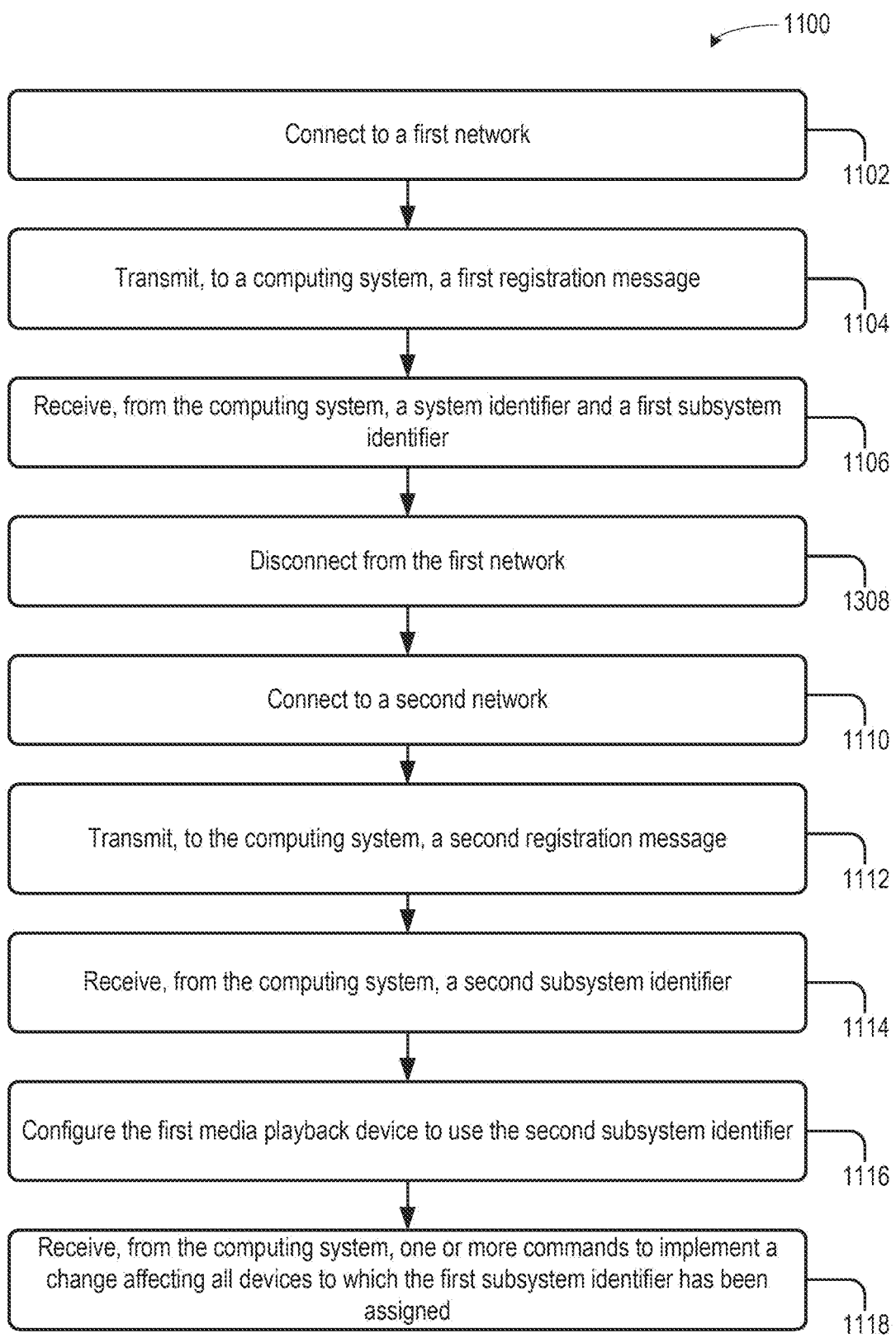
FIG. 11 is a flowchart of an example method.

Method 1100 in FIG. 11 shows an embodiment of a method that can be implemented within an operating environment including or involving, for example, the media playback system 100 of FIG. 1, one or more playback devices 200 of FIG. 2, one or more control devices 300 of FIG. 3, the user interface of FIG. 4, the configuration shown in FIG. 5, the NMD shown in FIG. 6, the media playback system 700 in FIG. 7 the media playback system 800, in FIG. 8, and/or the media playback system 900 in FIG. 9.

Method 1100 may include one or more operations, functions, or actions as illustrated by one or more of blocks 1102 through 1118. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 1100 and other processes and methods disclosed herein, the flowchart shows functionality and operation of one possible implementation of some embodiments. In this regard, each block may represent a module, a segment, or a portion of program code, which includes one or more instructions executable by one or more processors for implementing specific logical functions or steps in the process. The program code may be stored on any type of computer readable medium, for example, such as a storage device including a disk or hard drive. The computer readable medium may include non-transitory computer readable medium, for example, such as tangible, non-transitory computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 1100 and other processes and methods disclosed herein, each block in FIG. 11 may represent circuitry that is wired to perform the specific logical functions in the process.

Method 1100 begins at block 1102, which includes a first media playback device connecting to a first network.

At block 1104, method 1100 includes transmitting, to a computing system, a first registration message.

At block 1106, method 1100 includes receiving, from the computing system, a system identifier and a first subsystem identifier. In some embodiments, the first subsystem identifier may be associated with the system identifier.

At block 1108, method 1100 includes disconnecting from the first network.

At block 1110, method 1100 includes connecting to a second network.

At block 1112, method 1100 includes transmitting, to the computing system, a second registration message.

At block 1114, method 1100 includes receiving, from the computing system, a second subsystem identifier. In some embodiments, the second subsystem identifier may be associated with the system identifier.

At block 1116, method 1100 includes configuring the first media playback device to use the second subsystem identifier.

At block 1118, method 1100 includes receiving, from the computing system, one or more commands to implement a change affecting all devices to which the first subsystem identifier has been assigned.

Some embodiments further include after configuring the first media playback device to use the second subsystem identifier, transmitting, to the computing system, an advertisement message. In some embodiments, the advertisement message includes the second subsystem identifier.

Some embodiments further include receiving, from the computing system, a third subsystem identifier, wherein the third subsystem identifier is associated with the system identifier.

In some embodiments, configuring the first media playback device to use the second subsystem identifier includes storing the second subsystem identifier in a settings file of the first media playback device.

In some embodiments, after configuring the first media playback device to use the second subsystem identifier, transmitting, to the computing system, an advertisement message. In some embodiments, the advertisement message includes the second subsystem identifier stored in the settings file of the first media playback device.

Some embodiments further include (i) after transmitting the second registration message, waiting to receive, from the computing system, the second subsystem identifier, and (ii) after receiving the second subsystem identifier, transmitting, to the computing system, an advertisement message, wherein the advertisement message includes the second subsystem identifier.

Some embodiments further include (i) determining a location identifier of the first media playback device has changed, and (ii) in response to determining the location identifier has changed, sending, to the computing system, a third registration message.

In some embodiments, determining the location identifier of the first media playback device has changed includes determining that a GPS coordinate of the first media playback device has adjusted above a threshold value.

In some embodiments, determining the location identifier of the first media playback device has changed includes determining that the first media playback device in connected to a third network.

In some embodiments, determining the location identifier of the first media playback device has changed includes determining that the second network has experienced a DHCP change.

In some embodiments, the third registration message includes a re-registration message configured to update the computing system with respect to the DHCP change.

VII. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a computer memory, DVD, CD, Blu-ray, and so on, storing the software and/or firmware.

The invention claimed is:

1. A computing system comprising:
at least one processor;
non-transitory computer-readable medium; and
program instructions stored on the non-transitory computer-readable medium that are executable by the at least one processor such that the computing system is configured to:
receive, from a first media playback device connected to a first local area network, a first registration message, wherein the first media playback device is configured to operate as part of a media playback system, and wherein the media playback system is configured to include media playback devices connected to one or more of the first local area network and a second local area network;
in response to receiving the first registration message, assign a media playback system identifier and a first subsystem identifier to the first media playback device, wherein the media playback system identifier is associated with the computing system, and wherein the first subsystem identifier is associated with the media playback system identifier and the first local area network;
receive, from a second media playback device connected to the second local area network, a second registration message;
in response to receiving the second registration message, determine that the second media playback device is connected to the second local area network;
based on determining that the second media playback device is connected to the second local area network, assign the media playback system identifier and a second subsystem identifier to the second media playback device, wherein the second subsystem identifier is associated with the media playback system identifier and the second local area network;
receive a command to change a configuration setting on one or more devices associated with the second subsystem identifier but not the first subsystem identifier; and
in response to receiving the command to change the configuration setting on the one or more devices associated with the second subsystem identifier, cause the second media playback device to change the configuration setting on the second media playback device without causing the first media playback device to change the configuration setting on the first media playback device.

2. The computing system of claim 1, wherein the program instructions that are executable by the at least one processor such that the computing system is configured to assign the first subsystem identifier to the first media playback device comprise program instructions that are executable by the at least one processor such that the computing system is configured to:
   determine whether the first media playback device has a cached subsystem identifier; and
   in response to determining that the first media playback device does not have a cached subsystem identifier, assign the first subsystem identifier to the first media playback device.

3. The computing system of claim 1, wherein the program instructions that are executable by the at least one processor such that the computing system is configured to assign the first subsystem identifier to the first media playback device comprise program instructions that are executable by the at least one processor such that the computing system is configured to:
   determine whether the first media playback device has a cached subsystem identifier; and
   in response to determining that the first media playback device has a cached subsystem identifier, assign the cached subsystem identifier as the first subsystem identifier to the first media playback device.

4. The computing system of claim 1, wherein the program instructions that are executable by the at least one processor such that the computing system is configured to cause the second media playback device to change the configuration setting on the second media playback device comprise program instructions that are executable by the at least one processor such that the computing system is configured to:
   change the configuration setting on all of the devices associated with the second subsystem identifier.

5. The computing system of claim 1, further comprising program instructions that are executable by the at least one processor such that the computing system is configured to:
   receive, from a third media playback device connected to the second local area network, a third registration message;
   in response to receiving the third registration message, transmit, to the third media playback device, a message comprising the second subsystem identifier; and
   cause the third media playback device to change the configuration setting of the third media playback device.

6. The computing system of claim 1, further comprising program instructions stored on the non-transitory computer-readable medium that are executable by the at least one processor such that the computing system is configured to:
   determine that the second media playback device is disconnected from the second local area network and connected to the first local area network;
   in response to determining that the second media playback device is connected to the first local area network, assign the first subsystem identifier to the second media playback device; and
   transmit, to the second media playback device, a message comprising the first subsystem identifier.

7. The computing system of claim 6, wherein the program instructions that are executable by the at least one processor such that the computing system is configured to determine that the second media playback device is disconnected from the second local area network and connected to the first local area network comprise program instructions that are executable by the at least one processor such that the computing system is configured to:
   receive, from the second media playback device on the first local area network, a third registration message.

8. The computing system of claim 6, wherein the program instructions that are executable by the at least one processor such that the computing system is configured to determine that the second media playback device is disconnected from the second local area network and connected to the first local area network comprise program instructions that are executable by the at least one processor such that the computing system is configured to:
   query the second local area network to determine whether the second media playback device is connected to the second local area network; and
   based on a determination that the second media playback device is not connected to the second local area network, query the first local area network to determine whether the second media playback device is connected to the first local area network.

9. The computing system of claim 6, further comprising program instructions that are executable by the at least one processor such that the computing system is configured to:
   after assigning the first subsystem identifier to the second media playback device, receive, from the second media playback device, an advertisement message, wherein the advertisement message includes the first subsystem identifier.

10. A non-transitory computer-readable medium, wherein the non-transitory computer-readable medium is provisioned with program instructions that, when executed by at least one processor, cause a computing system to:
   receive, from a first media playback device connected to a first local area network, a first registration message, wherein the first media playback device is configured to operate as part of a media playback system, and wherein the media playback system is configured to include media playback devices connected to one or more of the first local area network and a second local area network;
   in response to receiving the first registration message, assign a media playback system identifier and a first subsystem identifier to the first media playback device, wherein the media playback system identifier is associated with the computing system, and wherein the first subsystem identifier is associated with the media playback system identifier and the first local area network;
   receive, from a second media playback device connected to the second local area network, a second registration message;
   in response to receiving the second registration message, determine that the second media playback device is connected to the second local area network;
   based on determining that the second media playback device is connected to the second local area network, assign the media playback system identifier and a second subsystem identifier to the second media playback device, wherein the second subsystem identifier is associated with the media playback system identifier and the second local area network;

receive a command to change a configuration setting on one or more devices associated with the second subsystem identifier but not the first subsystem identifier; and in response to receiving the command to change the configuration setting on the one or more devices associated with the second subsystem identifier, cause the second media playback device to change the configuration setting on the second media playback device without causing the first media playback device to change the configuration setting on the first media playback device.

11. The non-transitory computer-readable medium of claim 10, wherein the program instructions that, when executed by at least one processor, cause the computing system to assign the first subsystem identifier to the first media playback device comprise program instructions that, when executed by at least one processor, cause the computing system to:

determine whether the first media playback device has a cached subsystem identifier; and in response to determining that the first media playback device does not have a cached subsystem identifier, assign the first subsystem identifier to the first media playback device.

12. The non-transitory computer-readable medium of claim 10, wherein the program instructions that, when executed by at least one processor, cause the computing system to assign the first subsystem identifier to the first media playback device comprise program instructions that, when executed by at least one processor, cause the computing system to:

determine whether the first media playback device has a cached subsystem identifier; and in response to determining that the first media playback device has a cached subsystem identifier, assign the cached subsystem identifier as the first subsystem identifier to the first media playback device.

13. The non-transitory computer-readable medium of claim 10, wherein the program instructions that, when executed by at least one processor, cause the computing system to cause the second media playback device to change the configuration setting on the second media playback device comprise program instructions that, when executed by at least one processor, cause the computing system to:

change the configuration setting on all of the devices associated with the second subsystem identifier.

14. The non-transitory computer-readable medium of claim 10, wherein the non-transitory computer-readable medium is also provisioned with program instructions that, when executed by at least one processor, cause the computing system to:

receive, from a third media playback device connected to the second local area network, a third registration message;

in response to receiving the third registration message, transmit, to the third media playback device, a message comprising the second subsystem identifier; and cause the third media playback device to change the configuration setting of the third media playback device.

15. The non-transitory computer-readable medium of claim 10, wherein the non-transitory computer-readable medium is also provisioned with program instructions that, when executed by at least one processor, cause the computing system to:

determine that the second media playback device is disconnected from the second local area network and connected to the first local area network;

in response to determining that the second media playback device is connected to the first local area network, assign the first subsystem identifier to the second media playback device; and transmit, to the second media playback device, a message comprising the first subsystem identifier.

16. A method carried out by a computing system, the method comprising:

receiving, from a first media playback device connected to a first local area network, a first registration message, wherein the first media playback device is configured to operate as part of a media playback system, and wherein the media playback system is configured to include media playback devices connected to one or more of the first local area network and a second local area network;

in response to receiving the first registration message, assigning a media playback system identifier and a first subsystem identifier to the first media playback device, wherein the media playback system identifier is associated with the computing system, and wherein the first subsystem identifier is associated with the media playback system identifier and the first local area network;

receiving, from a second media playback device connected to the second local area network, a second registration message;

in response to receiving the second registration message, determining that the second media playback device is connected to the second local area network;

based on determining that the second media playback device is connected to the second local area network, assigning the media playback system identifier and a second subsystem identifier to the second media playback device, wherein the second subsystem identifier is associated with the media playback system identifier and the second local area network;

receiving a command to change a configuration setting on one or more devices associated with the second subsystem identifier but not the first subsystem identifier; and in response to receiving the command to change the configuration setting on the one or more devices associated with the second subsystem identifier, causing the second media playback device to change the configuration setting on the second media playback device without causing the first media playback device to change the configuration setting on the first media playback device.

17. The method of claim 16, wherein assigning the first subsystem identifier to the first media playback device comprises:

determining whether the first media playback device has a cached subsystem identifier; and in response to determining that the first media playback device does not have a cached subsystem identifier, assigning the first subsystem identifier to the first media playback device.

18. The method of claim 16, wherein assigning the first subsystem identifier to the first media playback device comprises:

determining whether the first media playback device has a cached subsystem identifier; and in response to determining that the first media playback device has a cached subsystem identifier, assigning the cached subsystem identifier as the first subsystem identifier to the first media playback device.

19. The method of claim 16, wherein causing the second media playback device to change the configuration setting on the second media playback device comprises:
changing the configuration setting on all of the devices associated with the second subsystem identifier.

20. The method of claim 16, further comprising:
receiving, from a third media playback device connected to the second local area network, a third registration message;
in response to receiving the third registration message, transmitting, to the third media playback device, a message comprising the second subsystem identifier; and
causing the third media playback device to change the configuration setting of the third media playback device.

* * * * *